(12) United States Patent  (10) Patent No.: US 7,633,655 B2
Yang  (45) Date of Patent: Dec. 15, 2009

(54) OPTICAL IMAGING DEVICE

(76) Inventor: Yuping Yang, 3252 Leesville Way, Dublin, OH (US) 43017

( * ) Notice: Subject to any disclaimer, the term of this patent is extended or adjusted under 35 U.S.C. 154(b) by 1096 days.

(21) Appl. No.: 11/079,654

(22) Filed: Mar. 14, 2005

(65) Prior Publication Data

US 2005/0206772 A1 Sep. 22, 2005

Related U.S. Application Data

(63) Continuation-in-part of application No. 10/960,791, filed on Oct. 7, 2004, now Pat. No. 7,164,518.

(60) Provisional application No. 60/510,185, filed on Oct. 10, 2003, provisional application No. 60/531,249, filed on Dec. 19, 2003, provisional application No. 60/572,639, filed on May 19, 2004.

(51) Int. Cl.
H04N 1/387 (2006.01)
H04N 1/04 (2006.01)

(52) U.S. Cl. ..................... 358/474; 358/450

(58) Field of Classification Search ............... 358/474, 358/475, 442, 443, 468, 471, 479, 482, 491, 358/494, 500, 505, 509, 513; 382/312, 319, 382/321; 353/30, 31, 32, 33; 359/205, 208, 359/209, 212, 213, 214
See application file for complete search history.

(56) References Cited

U.S. PATENT DOCUMENTS

| | | | |
|---|---|---|---|
| 4,174,904 A | 11/1979 | Murasaki et al. | |
| 4,395,662 A | 7/1983 | Sexton | 315/371 |
| 4,626,925 A | 12/1986 | Toyoda | 358/494 |
| 5,117,295 A | 5/1992 | Smitt | 358/474 |
| 5,253,085 A | 10/1993 | Maruo | 358/481 |
| 5,457,547 A | 10/1995 | Yamada | 358/487 |
| 5,511,148 A | 4/1996 | Wellner | 395/106 |
| 5,581,637 A | 12/1996 | Cass et al. | 382/284 |
| 5,625,183 A | 4/1997 | Kashitani et al. | 250/236 |
| 5,724,456 A | 3/1998 | Boyack et al. | 382/274 |
| 5,731,899 A | 3/1998 | Meyers | 359/621 |
| 5,748,338 A | 5/1998 | Lee | 358/473 |
| 5,757,518 A | 5/1998 | Kashitani | 358/474 |
| 5,822,125 A | 10/1998 | Meyers | 359/621 |
| 5,877,492 A | 3/1999 | Fujieda et al. | 250/208.1 |
| 5,909,521 A | 6/1999 | Nakao et al. | 382/312 |
| 5,920,401 A | 7/1999 | Street et al. | 358/400 |
| 5,973,798 A | 10/1999 | Segawa et al. | 358/497 |
| 6,061,102 A | 5/2000 | Sheppard et al. | 348/745 |
| 6,088,167 A | 7/2000 | Yamakawa | 359/662 |
| 6,094,512 A | 7/2000 | Lin et al. | 382/315 |
| 6,195,469 B1 | 2/2001 | Nishioka et al. | 382/274 |

(Continued)

Primary Examiner—Jerome Grant, II
(74) Attorney, Agent, or Firm—Morris, Manning & Martin LLP; Tim Tingkang Xia

(57) ABSTRACT

An optical imaging device for obtaining an image of a stationary image placed on an at least partially transparent platform. In one embodiment, the optical imaging device includes at least one illuminating plate having at least one open cell, at least one imaging head received in the at least one open cell of the at least one illuminating plate, and a light source adapted for emitting a light, where the at least partially transparent platform, the at least one illuminating plate, and the light source are arranged such that when in operation, a light emitted from the light source is directed into the at least one illuminating plate so that the light is evenly spread toward the at least partially transparent platform, reflected off the stationary image placed on the at least partially transparent platform and received by the at least one image head to obtain the image of the stationary image placed on the at least partially transparent platform.

75 Claims, 31 Drawing Sheets

U.S. PATENT DOCUMENTS

| | | | |
|---|---|---|---|
| 6,219,446 B1 | 4/2001 | Kiriki et al. | 382/167 |
| 6,233,014 B1 | 5/2001 | Ochi et al. | 348/324 |
| 6,263,117 B1 | 7/2001 | Lee | 382/254 |
| 6,278,108 B1 | 8/2001 | Ori | 250/235 |
| 6,288,802 B1 | 9/2001 | Hoshina et al. | 358/488 |
| 6,324,014 B1 | 11/2001 | Moskovich | 359/651 |
| 6,393,162 B1 | 5/2002 | Higurashi | 382/284 |
| 6,396,648 B1 | 5/2002 | Yamamoto et al. | 359/806 |
| 6,493,469 B1 | 12/2002 | Taylor et al. | 382/284 |
| 6,507,010 B1 | 1/2003 | Yamazaki et al. | 250/208.1 |
| 6,535,250 B1 | 3/2003 | Okisu et al. | 348/345 |
| 6,546,152 B1 | 4/2003 | Hou | 382/284 |
| 6,546,197 B2 | 4/2003 | Kamata et al. | 396/6 |
| 6,587,617 B2 | 7/2003 | Ho | 385/33 |
| 2003/0011898 A1 | 1/2003 | Mai et al. | 358/504 |
| 2003/0030820 A1 | 2/2003 | Kim et al. | 356/620 |
| 2003/0095294 A1 | 5/2003 | Shih et al. | 358/497 |
| 2003/0133172 A1* | 7/2003 | Hsieh et al. | 358/504 |
| 2003/0137751 A1* | 7/2003 | Hayashide | 359/806 |
| 2003/0142367 A1 | 7/2003 | Ito | 358/461 |
| 2003/0206287 A1* | 11/2003 | McClurg et al. | 356/71 |
| 2004/0025578 A1* | 2/2004 | Hare et al. | 73/105 |
| 2004/0065737 A1* | 4/2004 | Abramsohn | 235/454 |
| 2004/0090529 A1 | 5/2004 | Takahashi | 348/207.99 |

* cited by examiner

OPTICAL IMAGING DEVICE

CROSS-REFERENCE TO RELATED PATENT APPLICATION

This application is a continuation-in-part of U.S. patent application Ser. No. 10/960,791, filed Oct. 7, 2004, now U.S. Pat. No. 7,164,518 entitled "FAST SCANNER WITH ROTATABLE MIRROR AND IMAGE PROCESSING SYSTEM," by Yuping Yang, the disclosure of which is hereby incorporated herein by reference in its entirety, which itself claims the benefit, pursuant to 35 U.S.C. §119(e), of provisional U.S. patent application Ser. Nos. 60/510,185, 60/531, 249, and 60/572,639, filed on Oct. 10, 2003, Dec. 19, 2003 and May 19, 2004, respectively, entitled "FAST SCANNER WITH ROTARY MIRROR AND IMAGE PROCESSING SYSTEM," by Yuping Yang, which are incorporated herein by reference in their entireties.

Some references, which may include patents, patent applications and various publications, are cited in a reference list and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention generally relates to an optical imaging device, and in particular an optical imaging device that utilizes image heads for high-speed image acquiring and a reference pattern for high-speed image processing.

BACKGROUND OF THE INVENTION

In the last few years, the cost of electronic optical sensors has been lowered dramatically and digital imaging technology has been widely used in many different fields of applications. Also, the processing speed and power of microprocessors continue to increase and the cost of these microprocessors continues to decrease. However, scanners currently available on the market have not benefited greatly from the technical advances and price reductions.

In particular, one of many drawbacks associated with current scanning devices such as flatbed scanner is that scanning speed is very slow, as slow as 30 second per page. Current flatbed (glass-top) scanning devices, including flatbed scanners, the flatbed scanning portion of digital copiers and all-in-one machines, usually use a parallel moving scan head to capture the image of a stationary document. The scan head usually has a light source, mirrors, focusing lens and optical sensors. Among the many factors limiting the scanning speed such as line scan rate of optical sensor, data transferring rate, imaging processing speed, the speed of the mechanical movement of the scan heads is believed to be a major factor that limits the overall speed of current flatbed scanning devices. Therefore, eliminating the conventional scan head is the key to dramatically increase the scan speed.

In order to increase the scanning speed, alternative scanning mechanisms have been explored. U.S. Pat. No. 5,920,401 disclosed a compact document imager that may capture document image instantly. This device uses a large semi-transparent area optical sensor to do image capturing while illuminating the document using light from behind the optical sensor. Because light has to pass through the large area sensor, the sensor has low image capturing resolution. U.S. Pat. No. 6,747,764 B1 disclosed a "camera box" style device, which may capture document image instantly. It is understood that this device uses a digital camera, facing up, in a box that is topped with a transparent glass or plastic plate. The viewing angle of the field of view of the "camera" inside the box is limited. Therefore, it is difficult to capture the image of a large document without making the vertical dimension of the device relatively high. The bulky body of such a device makes it hard to be accepted as a document image-capturing device used in common offices.

Efforts have been made to overcome at least some of the aforementioned deficiencies. For example, in order to reduce the physical size of the scanner, multiple scan heads have been proposed, wherein each scan head provides a sub-image of the document. The new challenge is how to put all sub-images together. It is understood that U.S. Pat. No. 5,117,295 discloses a way to use "wires" placed between the imaging system and the document to serve as visual reference for sub-images alignment and for image reconstruction. Initialization and pre-scanning have to be used for sub-images alignment. In addition, "wires" are only used for alignment purpose. The sub-images taken by the disclosed imaging system are initially distorted and have un-even shading.

Therefore, a heretofore unaddressed need exists in the art to address the aforementioned deficiencies and inadequacies.

SUMMARY OF THE INVENTION

The present invention, in one aspect, relates to an optical imaging device having a housing. The housing has a bottom portion and an opposite, top portion. In one embodiment, the optical imaging device includes an at least partially transparent platform, which has a first surface and an opposite, second surface, and a thickness, h, defined therebetween by the first surface and the second surface. The at least partially transparent platform is positioned over the top portion of the housing. The at least partially transparent platform is adapted for supporting a stationary image that is placed on the first surface of the at least partially transparent platform. In one embodiment, the at least partially transparent platform includes a plate made of an at least partially transparent material. The at least partially transparent platform, in one embodiment, has a glass plate, and in another embodiment, has a transparent plastic plate.

The optical imaging device further includes a reference pattern formed in the at least partially transparent platform at a plane substantially parallel to and at a distance, d, from the first surface of the at least partially transparent platform, where d is greater than zero but not greater than the thickness h of the at least partially transparent platform. In one embodiment, the reference pattern is formed on the second surface of the at least partially transparent platform at a predetermined position, and the distance d substantially equals to the thickness h of the at least partially transparent platform. The reference pattern has at least two colors that are substantially distinguishable from each other. In one embodiment, the reference pattern includes a white area with a plurality of markers, and each marker is placed at a predetermined position in the white area, and identifiable from the white area. In another embodiment, the reference pattern includes a grid.

Furthermore, the optical imaging device includes a plate placed inside the housing. The plate has a first surface that is substantially reflective and an opposite, second surface. The plate is positioned above the bottom portion of the housing such that the first surface of the plate is facing the second surface of the at least partially transparent platform. The first surface of the plate is adapted for substantially evenly spreading the emitted light toward the stationary image through the at least partially transparent platform. In one embodiment, the first surface of the plate is rugged.

Moreover, the optical imaging device has a number, N, of image heads. Each of the number N of image heads has a head portion with a dimension and positioned on the plate in relation to its neighboring image heads to satisfy the relation of l<L, with l being a characteristic dimension of the number N of image heads, and L being a characteristic distance between two neighboring image heads. In one embodiment, the number N of image heads are substantially identical such that $l=l_1=l_2=\ldots=l_N$, where $l_i$ is the dimension of the ith image head, i=1, 2, ..., N, and N is the total number of the image heads. In another embodiment, the number N of image heads are different such that at least two of image heads may have different characteristic dimensions, and $l=Max\{l_i, i=1, \ldots, N\}$, where Max{ } represents a mathematical operation to choose a maximum value. In one embodiment, the number N of image heads are positioned in an array such that any two neighboring heads have a substantially identical minimum distance, and $L=L_1=L_2=\ldots=L_M$, where $L_j$ is a characteristic distance between the jth pair of neighboring image heads, j=1, 2, ..., M, and M is the total number of pairs of the neighboring image heads. In another embodiment, the number N of image heads are positioned in an array such that different pairs of neighboring heads may have different minimum distances, and $L=Min\{L_j, j=1, \ldots, M\}$, where Min{ } represents a mathematical operation to choose a minimum value.

Each image head obtains at least a partial image of the stationary image placed on the first surface of the at least partially transparent platform. In one embodiment, each image head includes a lens structure having an optical axis and an imaging sensor placed on the optical axis of the lens structure such that a light received by the lens structure is focused on the imaging sensor. In another embodiment, each image head includes a lens structure and a waveguide member having an input end and an output end, where the lens structure and the waveguide member are arranged such that in operation, a light received by the lens structure is directed into the input end of the waveguide member and transmitted out from the output end of the waveguide member. In one embodiment, each image head further comprises an imaging sensor coupled with the output end of the waveguide member. The waveguide member, in one embodiment, has a bundle of optical fibers, which are dimensionally associated with one another.

Furthermore, the optical imaging device has a light source that is positioned inside the housing adapted to direct a light beam at the first surface of the plate so that the light beam is reflected to the at least partially transparent platform, reflected off the at least partially transparent platform and received by the number N of image heads to obtain an image of the stationary image placed on the first surface of the at least partially transparent platform. In one embodiment, the light source includes at least one of a fluorescent light tube, a light emitting diode assembly, a tungsten lamp, a tungsten halogen lamp, a halogen lamp, an Xenon lamp, and any combination thereof.

The optical imaging device further has an image processing system coupled with the number N of image heads for combining the partial images of the stationary image to form a substantially complete image of the stationary image.

In another aspect, the present invention relates to an optical imaging device for obtaining an image of a stationary image placed on an at least partially transparent platform that has a first surface adapted for supporting the stationary image, and an opposite, second surface.

In one embodiment, the optical imaging device has at least one illuminating plate. The at least one illuminating plate includes a light guiding layer having a first surface and an opposite, second surface, a diffuser layer positioned on the first surface of the light guiding layer, a light aligning layer positioned on the diffuser layer, and at least one open cell formed on the illuminating plate. The at least one illuminating plate is positioned in relation to the at least partially transparent platform such that when in operation, a light received by the light guiding layer is guided to and diffused in the diffuser layer, spread to the light aligning layer, and directed to the at least partially transparent platform. In one embodiment, the second surface of the light guiding layer is reflective to a light received by the surface. In another embodiment, the second surface of the light guiding layer is rugged. In one embodiment, the at least one illuminating plate further has a support layer formed on the second surface of the light guiding layer so that an interface is formed therebewteen the support layer and the light guiding layer. The interface in one embodiment is substantially reflective to a light received by the interface. In another embodiment, the interface is rugged. In one embodiment, the light guiding layer is made of a transparent material, where the transparent material comprises a glass, or a transparent material. The diffuser layer is made of mat glass or semi-transparent plastic. In one embodiment, the light aligning layer includes a structural pattern that is adapted for aligning a light transmitted from the diffuser layer to a predetermined direction. The structural pattern in one embodiment has a plurality of open cells that are dimensionally associated with one another. In another embodiment, the structural pattern has a plurality of fibers that are dimensionally associated with one another.

In an alternative embodiment, the at least one illuminating plate includes a support layer having a first surface and an opposite, second surface, a diffuser layer having a first surface and an opposite, second surface, and a space defined therebetween the firs surface of the support layer and the second surface of the diffuser layer and containing ambient air. Furthermore, the at least one illuminating plate has further comprises a light aligning layer positioned on the first surface of the diffuser layer. In one embodiment, the first surface of the support layer is substantially reflective to a light received by the surface. In another embodiment, the first surface of the support layer is rugged.

Furthermore, the optical imaging device has at least one imaging head received in the at least one open cell of the at least one illuminating plate. In one embodiment, the at least one image head includes a lens structure having an optical axis and an imaging sensor placed on the optical axis of the lens structure such that a light received by the lens structure is focused on the imaging sensor. In another embodiment, the at least one image head includes a lens structure and a waveguide member having an input end and an output end, where the lens structure and the waveguide member are arranged such that when in operation, a light received by the lens structure is directed into the input end of the waveguide member and transmitted out from the output end of the waveguide member.

Moreover, the optical imaging device has a light source positioned such that when in operation, a light emitted from the light source is directed into the light guiding layer of the at least one illuminating plate so that the light is evenly spread toward the at least partially transparent platform, reflected off the at least partially transparent platform and received by the at least one image head to obtain the image of the stationary image placed on the first surface of the at least partially transparent platform.

In yet another aspect, the present invention relates to an optical imaging device for obtaining an image of a stationary image placed on an at least partially transparent platform. The at least partially transparent platform has a first surface on which the stationary image is placed, an opposite, second surface, and a thickness, h, defined by the first surface and the second surface. In one embodiment, the optical imaging device includes a reference pattern formed at a plane substantially parallel to and at a distance, d, from the first surface of the at least partially transparent platform, where d is greater than zero but not greater than the thickness h of the at least partially transparent platform. The reference pattern has at least two colors that are substantially distinguishable from each other. In one embodiment, the reference pattern includes a white area with a plurality of markers with each marker placed at a predetermined position in the white area and being identifiable from the white area. In another embodiment, the reference pattern comprises a grid, which is comprised of two contrast colors.

The optical imaging device further includes optical means for obtaining consecutive partial images of the stationary image, where each of the consecutive partial images includes an at least partial image of the reference pattern. In one embodiment, the at least partial image of the reference pattern comprises the image of at least one of the plurality of markers. The optical means, in one embodiment, has at least one image head, where the optical means comprises an array of image heads.

Additionally, the optical imaging device includes an image processing system for using the image of the partial image of the reference pattern in each of the consecutive partial images as a reference to combine the consecutive partial images so as to form a substantially complete image of the stationary image.

In a further aspect, the present invention relates to a method for obtaining an image of a stationary image placed on an at least partially transparent platform having a first surface on which the stationary image is placed, an opposite, second surface, and a thickness, h, defined by the first surface and the second surface.

In one embodiment, the method includes the step of forming a reference pattern at a plane substantially parallel to and at a distance, d, from the first surface of the at least partially transparent platform, where d is greater than zero but not greater than the thickness h of the at least partially transparent platform. In one embodiment, the reference pattern includes a white area with a plurality of markers with each marker placed at a predetermined position in the white area, and being identifiable from the white area. In another embodiment, the reference pattern includes a grid.

Furthermore, the method includes the step of obtaining consecutive partial images of the stationary image. Each of the consecutive partial images includes an at least partial image of the reference pattern. In one embodiment, the obtaining step is performed with an array of image heads. Moreover, the method includes the step of using the partial image of the reference pattern in each of the consecutive partial images as a reference to combine the consecutive partial images so as to form a substantially complete image of the stationary image. In one embodiment, at least partial image of the reference pattern comprises the image of at least one of the plurality of markers.

In yet a further aspect, the present invention relates to an optical imaging device for obtaining an image of a stationary image placed on an at least partially transparent platform. The at least partially transparent platform has a first surface on which the stationary image is placed, an opposite, second surface, and a thickness, h, defined by the first surface and the second surface. In one embodiment, the optical imaging device includes two or more image heads for obtaining images of the stationary image, where each of the image heads has a head portion with a dimension and the two or more image heads are positioned in relation to each other to satisfy the relation of l<L, with l being a characteristic dimension of the image heads, L being a characteristic distance between two neighboring image heads. In one embodiment, the image heads are substantially identical such that $l=l_1=l_2=\ldots=l_N$, where $l_i$ being the dimension of the ith image head, $i=1, 2, \ldots, N$, and N is the total number of the image heads. In another embodiment, the image heads are different such that at least two of image heads may have different characteristic dimensions, and $l=\text{Max } l_i, i=1, \ldots, N$. In one embodiment, the image heads are positioned in an array such that any two neighboring heads have a substantially identical minimum distance, and $L=L_1=L_2=\ldots=L_M$, where $L_j$ is a characteristic distance between the jth pair of neighboring image heads, $j=1, 2, \ldots, M$, and M is the total number of pairs of the neighboring image heads. In another embodiment, the image heads are positioned in an array such that different pairs of neighboring heads may have different minimum distances, and $L=\text{Min}\{L_j, j=1, \ldots, M\}$.

The optical imaging device further comprises a reference pattern formed at a plane substantially parallel to and at a distance, d, from the first surface of the at least partially transparent platform, where d is greater than zero and is not substantially greater than the thickness h of the at least partially transparent platform. The two or more image heads for obtaining images of the stationary image are adapted for obtaining consecutive partial images of the stationary image, and each of the consecutive partial images includes an at least partial image of the reference pattern. The optical imaging device also comprises an image processing system for using the image of the partial image of the reference pattern in each of the consecutive partial images as a reference to combine the consecutive partial images so as to form a substantially complete image of the stationary image.

In one aspect, the present invention relates to an imaging tile mountable and modulable to an optical imaging device. In one embodiment, the imaging tile includes at least one image head for obtaining an image of a stationary image. The imaging tile is formed in a multilayer structure. In one embodiment, the multilayer structure comprises a light guiding layer having a first surface, an opposite, second surface and a lateral, third surface joined by the first surface and the second surface, and a diffuser layer deposited on the first surface of the light guiding layer. In one embodiment, the third surface of the light guiding layer has an anti-reflective coating. The multilayer structure further include an aligning layer deposited on the diffuser layer and adapted for aligning a light transmitted from the diffuser layer to a predetermined direction.

These and other aspects of the present invention will become apparent from the following description of the preferred embodiment taken in conjunction with the following drawings, although variations and modifications therein may be affected without departing from the spirit and scope of the novel concepts of the disclosure.

DETAILED DESCRIPTION OF THE INVENTION

Figure 1:
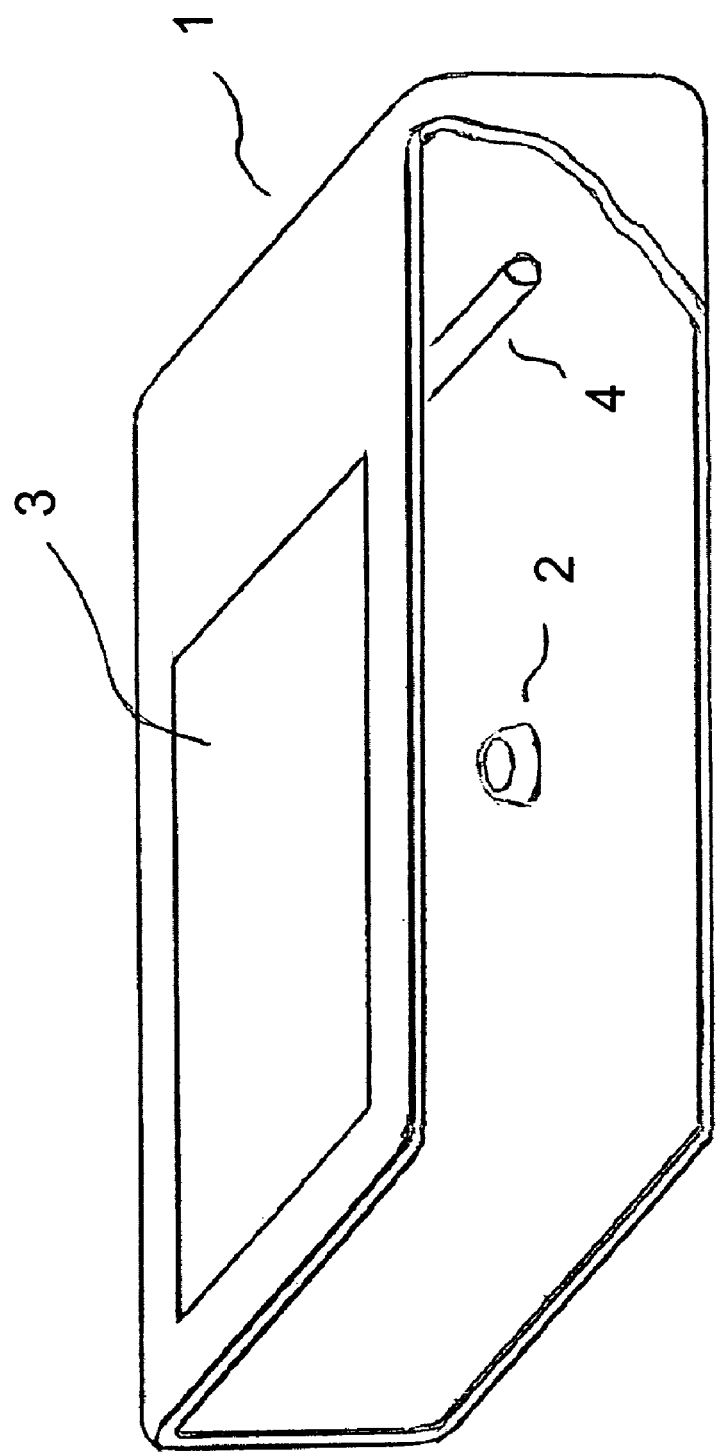
FIG. 1 shows a conventional camera-box scanner.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings 2-30. In accordance with the purposes of this invention, as embodied and broadly described herein, this invention, in one aspect, relates to an optical imaging device for obtaining an image of an object which can be a stationary image such as a document, a picture, a combination of them, or the like. The optical imaging device of the present invention can be a stand-alone scanner, or a scanning portion of an imaging device such as a copy machine. In other words, while the description below is given by using scanner as an example, it is understood that the present invention can be practiced in the forms of a scanner, a copy machines, or other types of imaging forming devices.

FIG. 1 shows a camera-box style scanner 1 as disclosed in U.S. Pat. No. 6,747,764 B1. The design uses one optical sensor head or imaging head that includes a camera with optical sensors and focusing lenses (not shown) to capture the image of a document. The document is placed on a transparent plate 3 and is illuminated by a light source 4. The scanner shown in FIG. 1 can capture document image in camera speed. This device has a relatively large vertical dimension.

Figure 2:
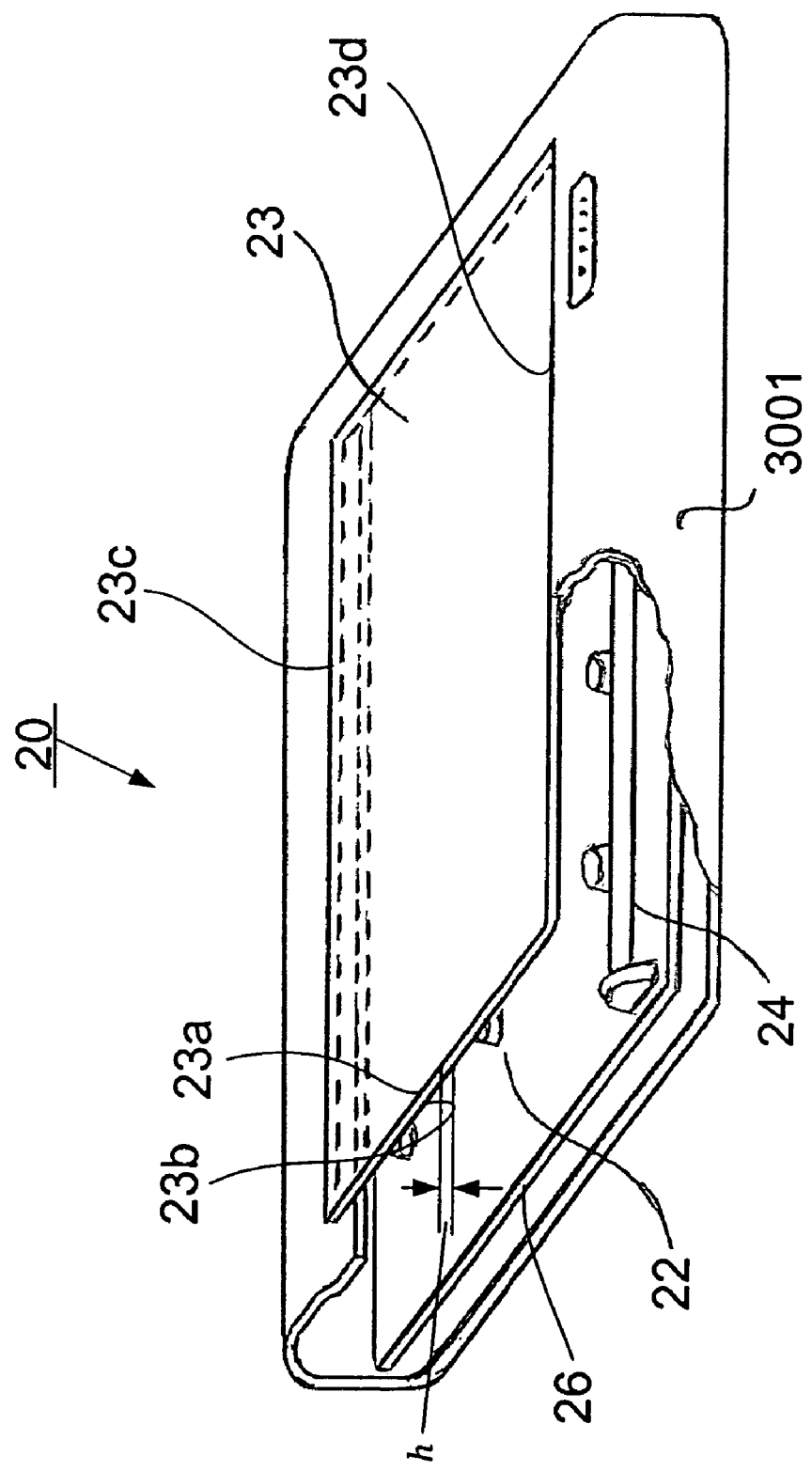
FIG. 2 shows schematically a perspective view of an optical imaging device according to one embodiment of the present invention.
Figure 3:
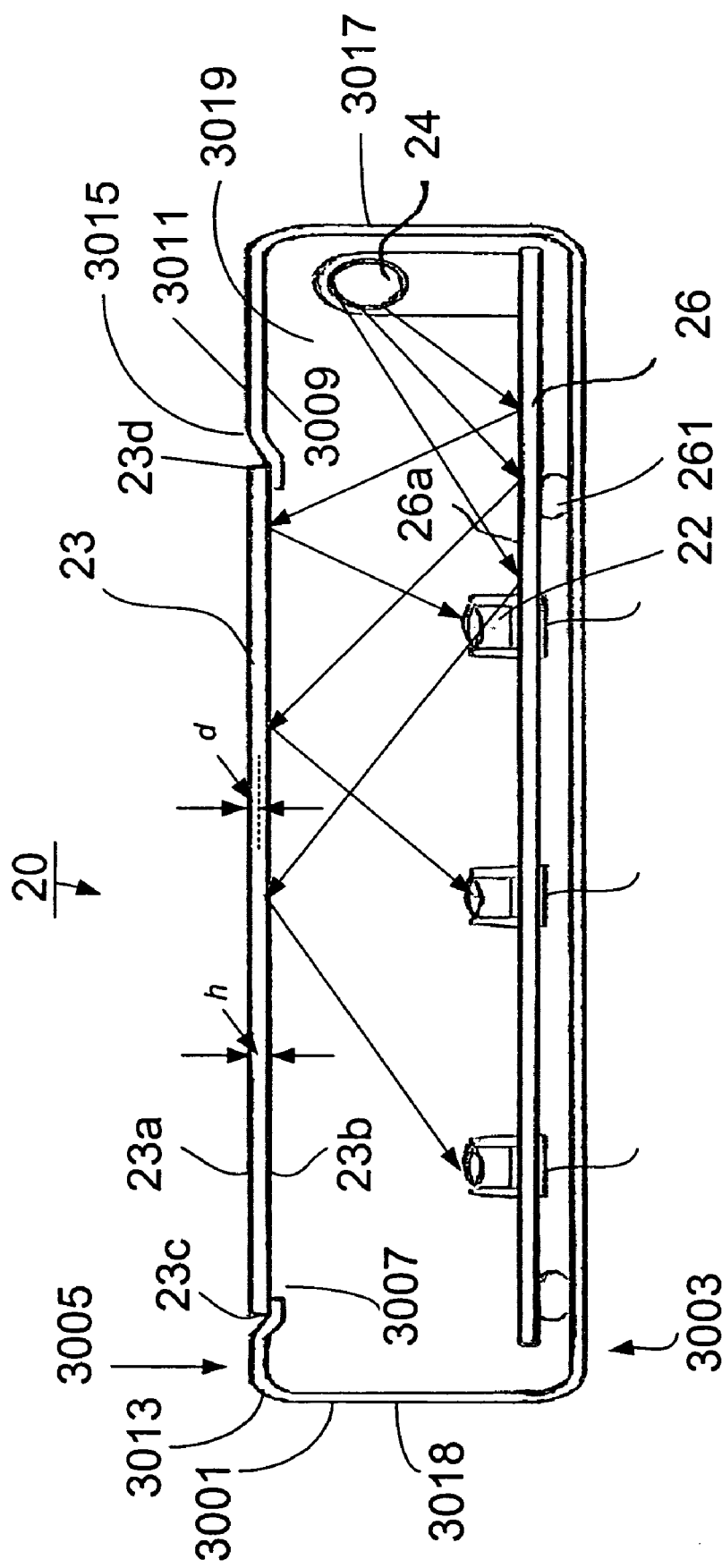
FIG. 3 shows schematically a side view of the optical imaging device, as shown in FIG. 2.

Referring to FIGS. 2 and 3, an optical imaging device 20 according to one embodiment of the present invention includes one or more imaging heads 22, an at least partially transparent platform 23 with a top (/first) surface 23a, a bottom (/second) surface 23b and two edges 23c and 23d, respectively, a light source 24, a housing 3001, and a support plate 26.

As formed, the housing 3001 has a bottom portion 3003, and an opposite, top portion 3005 that has a first arm portion 3013 and an opposite, second arm portion 3015 extending toward each other thereby defining an opening 3007. The housing 3001 further has an interior 3009, an exterior 3011 and a side portion 3017. The second arm portion 3015, the side portion 3017 and the bottom portion 3003 together define a sub-chamber 3019. To avoid strong light hurting the eyes of the human operator, it is preferred that the light source 24 is positioned in the sub-chamber 3019 so that the light emitted from the light source is blocked by the non-transparent part of the housing 3001. When additional light source is needed, the first arm portion 3005, the side portion 3018 and the bottom portion 3003 can be formed to define an additional sub-chamber like the sub-chamber 3019 to host additional light source.

The at least partially transparent platform 23 is positioned over the housing 3001 covering the opening 3007 between the first arm portion 3005 and the second arm portion 3015. The width between surface 23c and 23d is greater than the opening 3007 so both arm portions can support this platform 23. Each of the arm portions 3005 and 3015 can have notched edge to firmly hold the at least partially transparent platform 23. The thickness, h, of t the at least partially transparent platform 23 is defined therebetween by the top surface 23a and the bottom surface 23b of the at least partially transparent platform 23.

The support plate 26 is positioned on the supporting components 261. The light source 24 is mounted to the support plate 26 to illuminate the object to be scanned, and the one or more imaging heads 22 are positioned on the top surface 26a of the support plate 26 to obtain an image of an object placed on the at least partially transparent platform 23. The top surface 26a of the support plate 26 is a substantially reflective surface to evenly distribute the light from the light source 24 to the object. In order to generate evenly distributed illuminating light on the object, the top surface 26a of the support plate 26 can be made reflective and/or rugged. In the embodiment as shown in FIG. 3, a light from the light source 24 projects to and reflects off the top surface 26a of the support plate 26, then illuminates the object placed on the at least partially transparent platform 23, and subsequently reflects off the stationary image on the top surface 23a of the at least partially transparent platform 23 and reaches the imaging heads 22, which receives the reflected light that contains the image of the object and transmits signals corresponding to the image of the object to an image processing unit to obtain the image of the object. In one embodiment, an anti-reflective coating can be applied to the bottom surface 23b of the at least partially transparent platform 23 to reduce the reflection from the bottom surface 23b. Note that the application of an individual support plate is optional. The support plate 26 may be a part of the interior surface of the housing 3001, or may be a part of the bottom portion 3003 of the housing 3001.

Figure 3A:
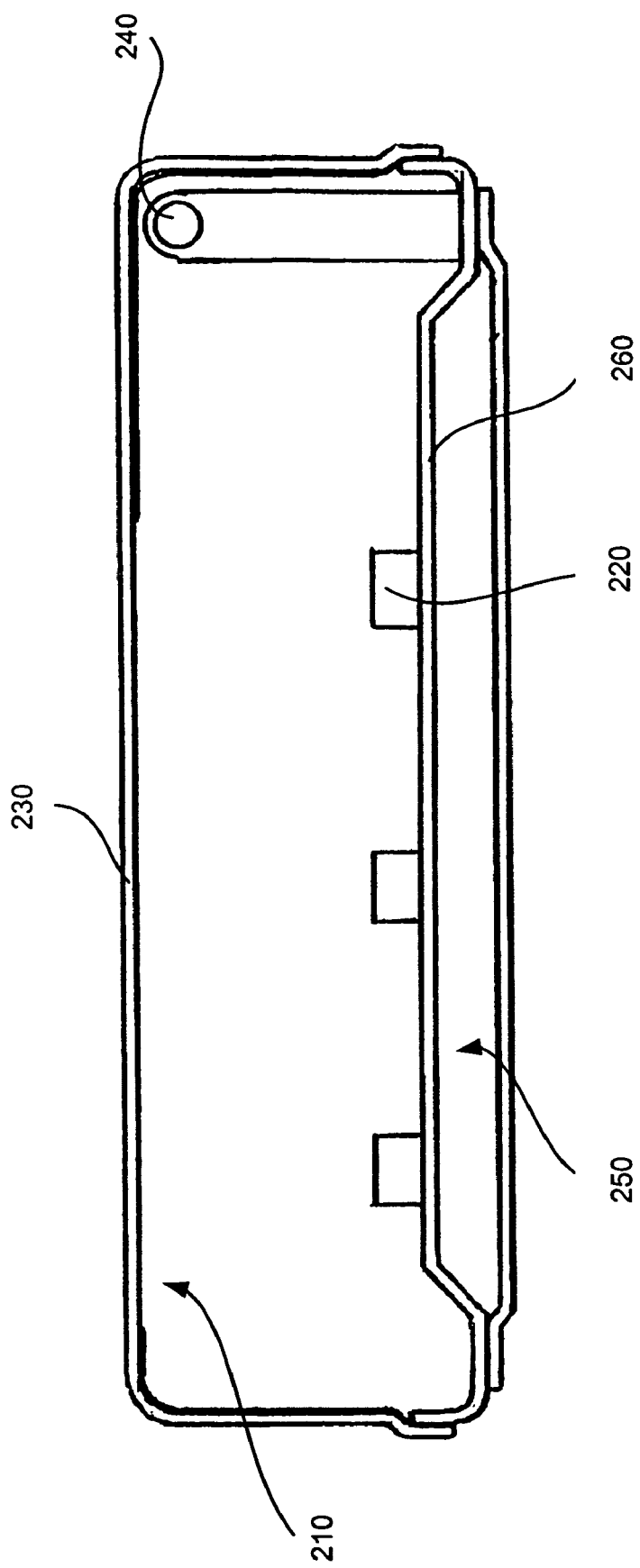
FIG. 3a shows schematically a side view of the optical imaging device according to another embodiment of the present invention.

Referring to FIG. 3a, an optical imaging device is shown according to an alternative embodiment of the present invention, which is very similar to FIG. 3, but no support plate is applied. In this embodiment, the optical imaging device includes an at least partially transparent platform 230 positioned in a top portion 210 of the optical device, and a number of image heads 220 placed in a bottom portion 250 of the optical imaging device. Additionally, the optical imaging device has a light source 240 for emitting a light, and a support plate 260 is formed as a part of the bottom portion 250 of the optical imaging device.

Figure 4:
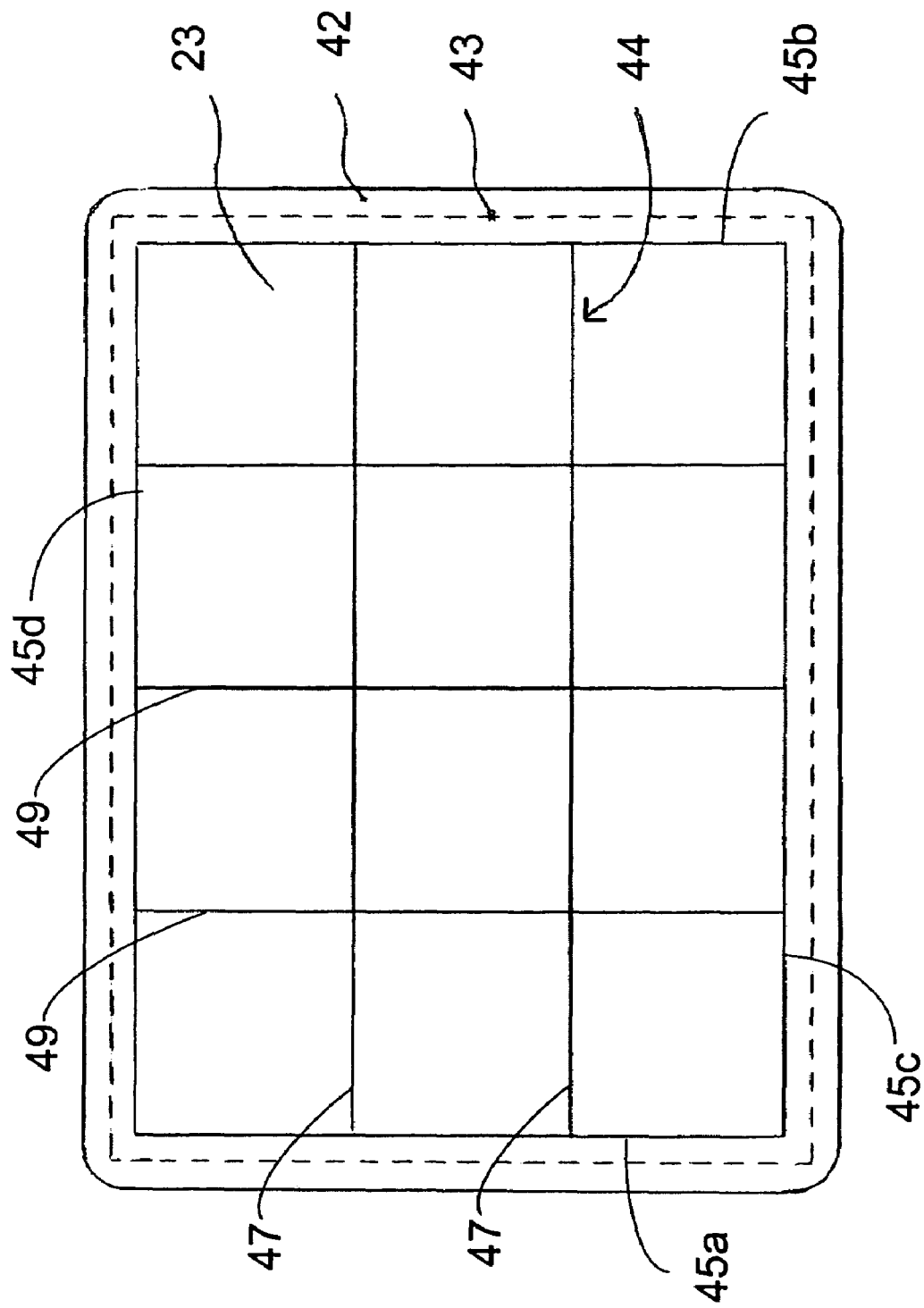
FIG. 4 shows schematically a bottom view of an at least partially transparent platform of an optical imaging device according to one embodiment of the present invention.
Figure 4A:
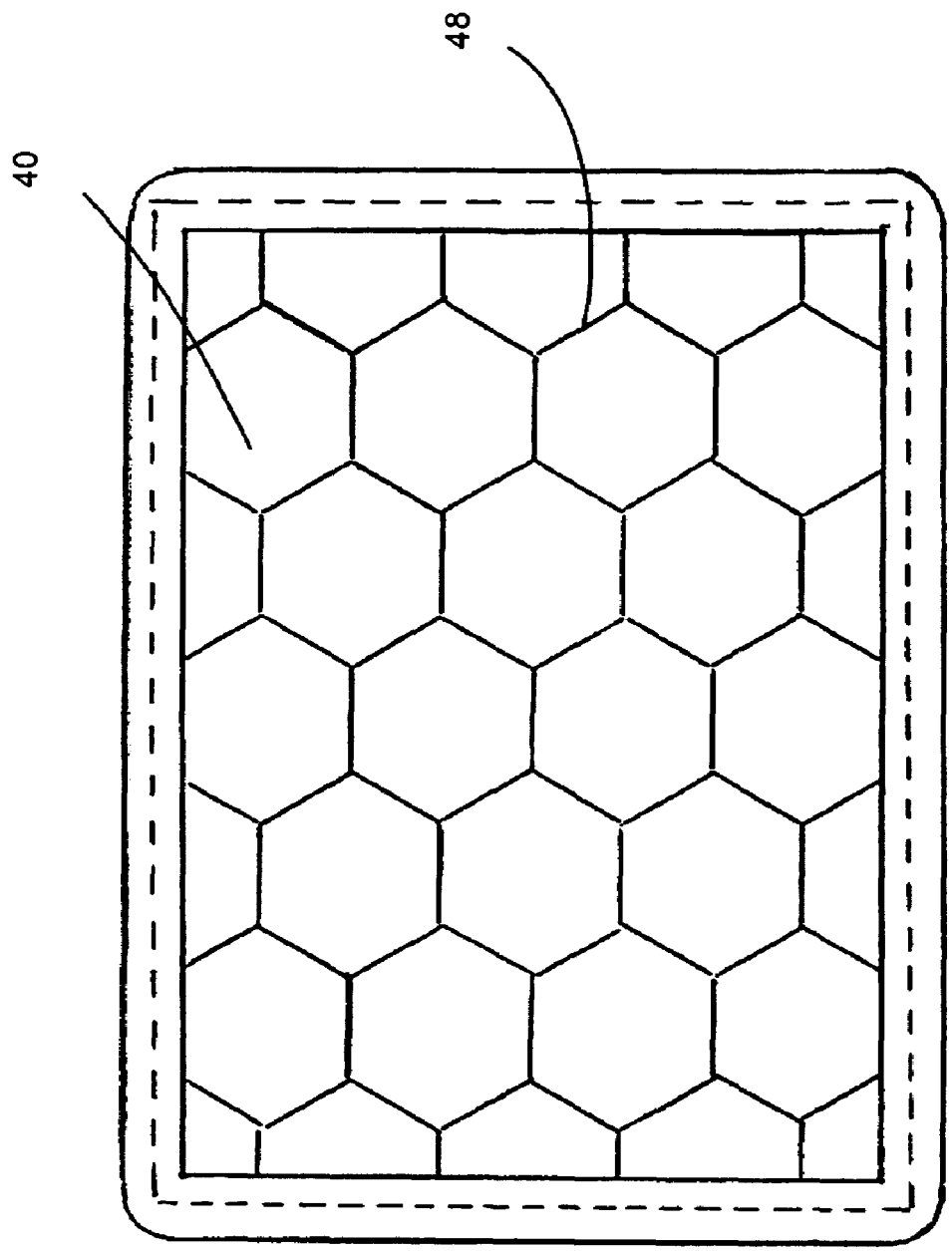
FIG. 4a shows schematically a bottom view of an at least partially transparent platform of an optical imaging device according to another embodiment of the present invention.
Figure 5:
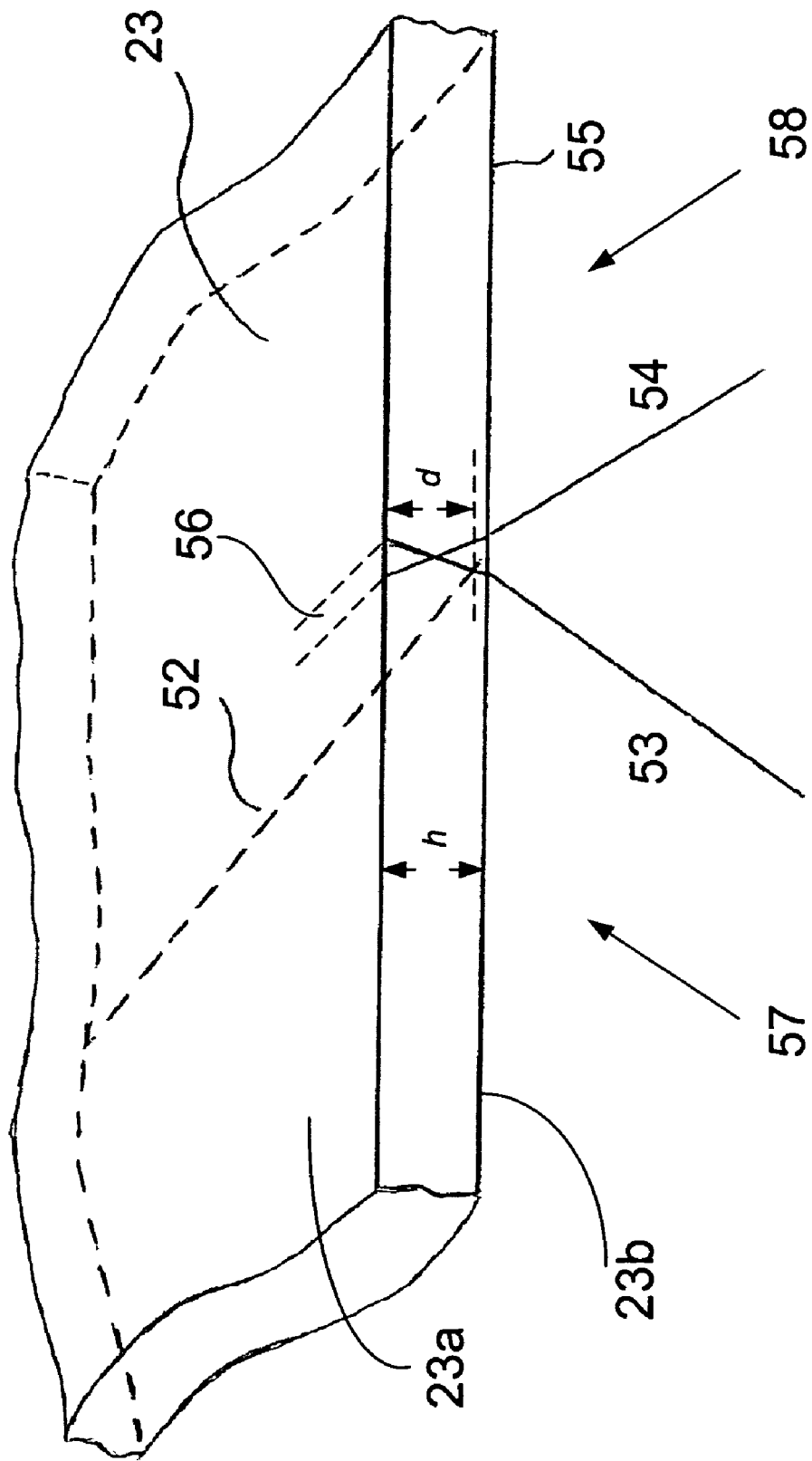
FIG. 5 shows schematically a perspective view of a portion of the at least partially transparent platform, as shown in FIG. 4.

Referring to FIGS. 4, 4a and 5, the at least partially transparent platform 23 contains a reference pattern. The reference pattern is formed at a plane substantially parallel to and at a distance, d, from the top surface 23a of the at least partially transparent platform 23, where d is greater than zero but not greater than the thickness h of the at least partially transparent platform 23. In one embodiment, the distance d is substantially equal to the thickness h of the at least partially transparent platform 23. Thus, in this embodiment, the reference pattern is substantially formed on the bottom surface 23b of the at least partially transparent platform 23. The reference pattern includes at least two colors that are substantially distinguishable from each other. In one embodiment, the reference pattern includes a white area 42 with a plurality of markers 43, each marker is placed at a predetermined position in white area with a color contrasting to the white area and being identifiable from the white area. The white area 42 is non-transparent and in "standard white" color.

The image of the white area 42 is captured along with an image of an object by imaging heads. The "standard whiteness" can be used for shading correction reference in image processing after the image of the object is captured. The use of "standard white" for shading correction in image processing is a common practice known to people skilled in the art and is not elaborated here. In the embodiment as shown in FIG. 4, the white area 42 surrounds the scan area. The white area 42 is non-transparent. Markers 43 is formed on the white area 42 and used to eliminate image distortion and combine sub-images in an image processing (not shown).

The reference pattern may also comprise a grid 44. In one embodiment the grid 44 is formed in at least two colors that are distinguishable from each other. The grid 44 includes at least one first line 47 extending from one end 45a to an opposite end 45b of the at least partially transparent platform 23, and at least one second line 49 extending from one end 45c to an opposite end 45d of the at least partially transparent platform 23. The at least first line 47 and the at least second line 49 are substantially perpendicular to each other. Other forms of the grid can also be utilized to practice the present invention. For example, FIG. 4a shows a bottom view of an alternative embodiment of a reference grid 48 in the at least partially transparent platform 40.

The grid 44, the white area 42 and the markers 43 together form a visual reference pattern for an image processing system to precisely eliminate image distortion and properly combine sub-images. In one embodiment, the reference pattern is used to mark boundaries of the sub-images of a document. Because of the existence of viewing angles of the field of view of the imaging head, the area on the document from which a corresponding sub-image is captured is always slightly larger than the area delimited by the reference gird lines. As shown in FIG. 5, one sub-image 57, marked by a boundary line 53, is partially shown on the left-hand side, and another sub-image 58, marked by a boundary line 54, is partially shown on the right-hand side. The sub-images 57, 58 are usually overlapped with a substantially small strip 56. The placement of a reference pattern strategically at the distance d from the top surface of 23a of the at least transparent platform 23 is to prevent the reference grid 52 from appearing in the sub-images 57, 58, as illustrated in FIG. 5, where the reference grid 52 is outside of both boundaries 53 and 54 of the sub-images 57 and 58, respectively.

Figure 6:
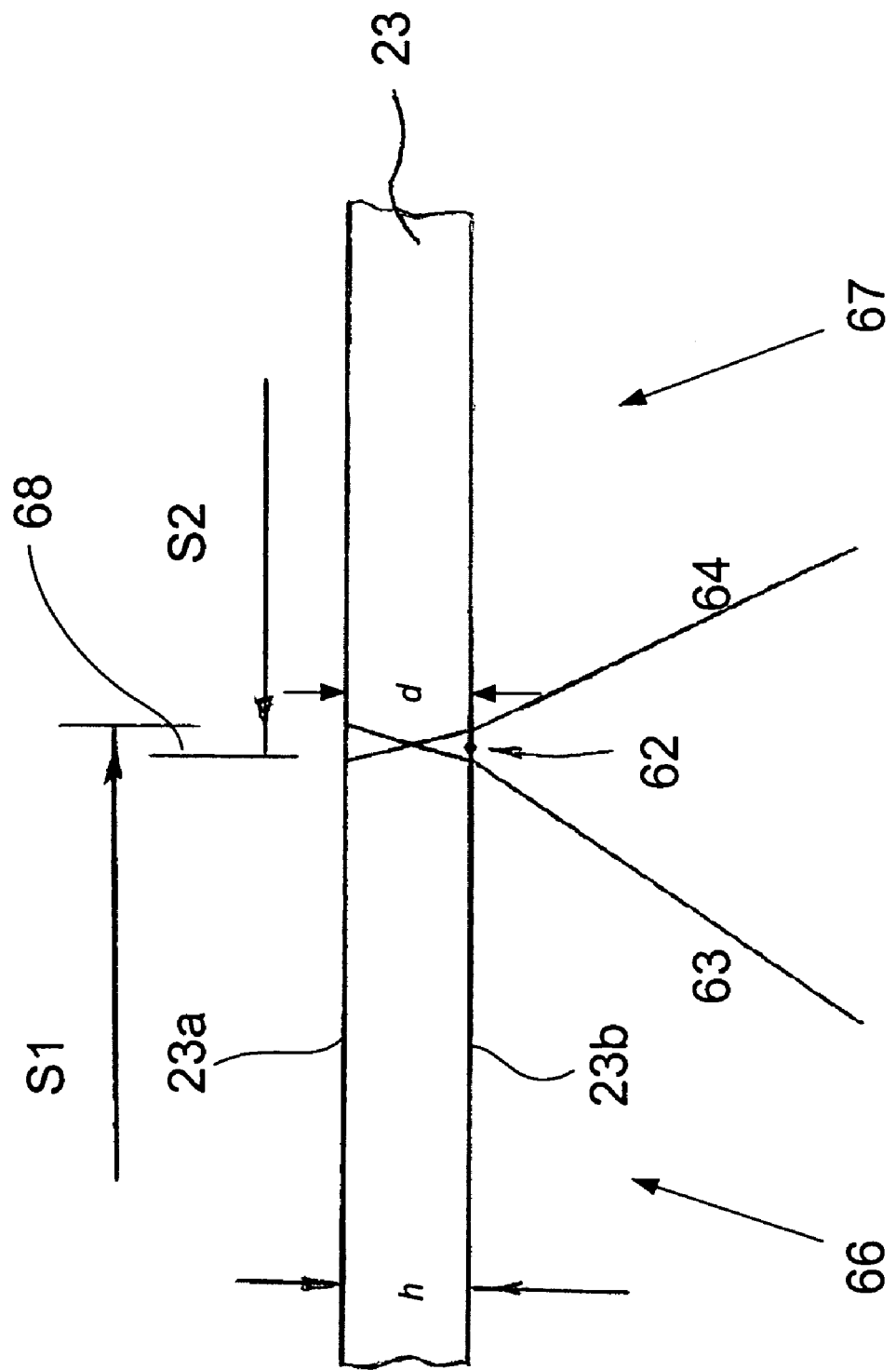
FIG. 6 shows schematically a side view of the at least partially transparent platform as shown in FIG. 4.

Referring to FIG. 6, another embodiment of the present invention is partially shown with a cross-sectional view. In the embodiment, the reference grid 62 is placed on the bottom surface 23b of the at least partially transparent platform 23, where the distance d is equal to the platform thickness h. One sub-image 66 with a viewing area S1 is marked by a corresponding boundary 63, and another sub-image 67 with a viewing area S2 is marked by a corresponding boundary 64 with an overlapped area 68. As shown in FIG. 6, the reference grid 62 is not included in either sub-image 66 or sub-image 67.

The shape and size of the markers on the white area may vary. Preferably, simple geometric shapes can be chosen to reduce the amount of data for image processing and the complexity of computations performed by an image processing system.

Figure 7:
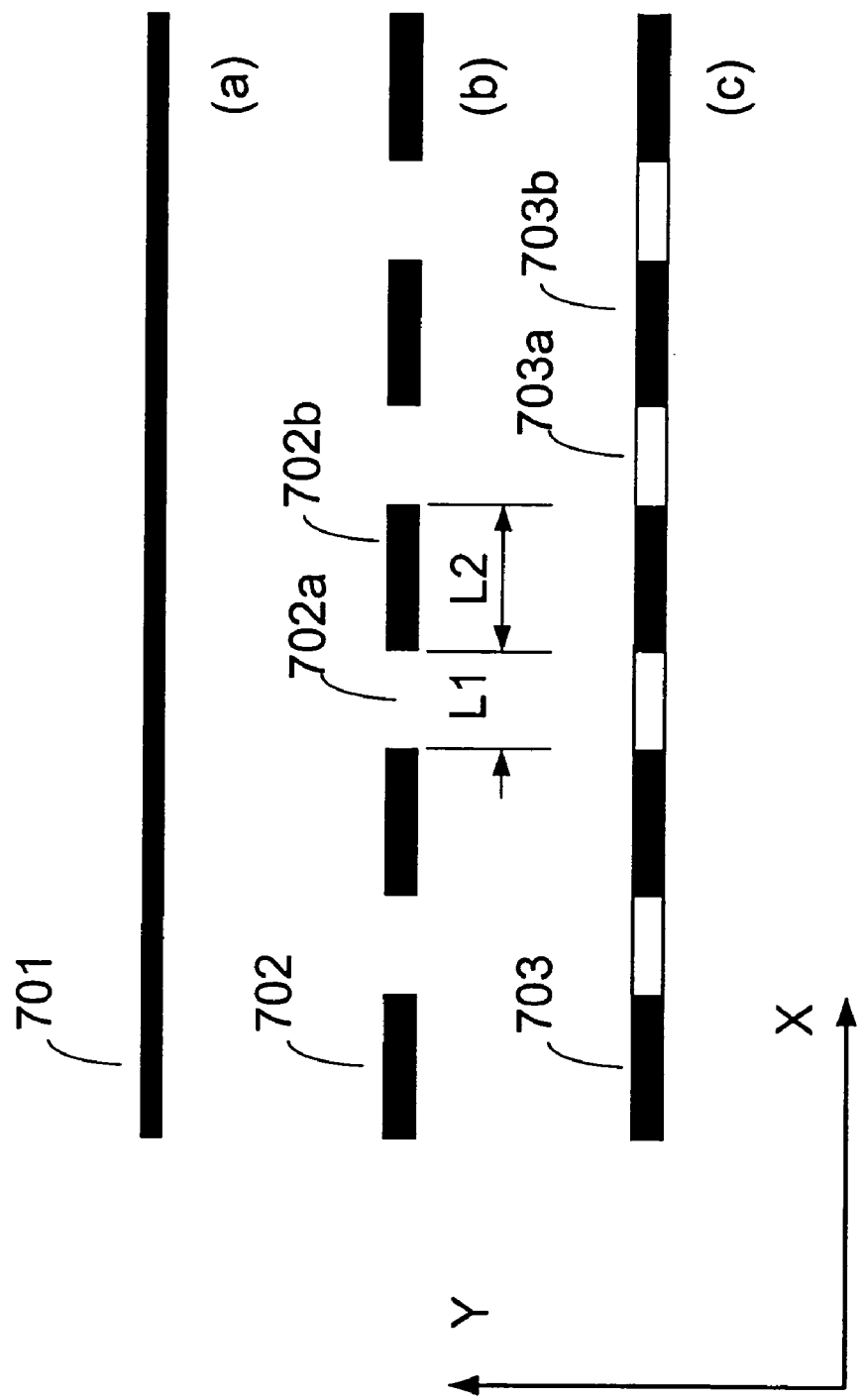
FIG. 7 shows schematically a reference pattern of an optical imaging device: (a) according to one embodiment of the present invention, (b) according to another embodiment of the present invention, and (c) according to an alternative embodiment of the present invention.

Referring now to FIG. 7, three examples of markers are shown. FIG. 7(a) shows a solid line 701 and FIG. 7(b) shows a dashed line 702 formed with alternatively solid dark section 702b and solid white section 702a. For the embodiment as shown in FIG. 7(b), the length L1 of a contrasting colored line segment and the length L2 of the gap between the contrasting colored line segments are defined precisely and consistently, providing an additional position reference in both X and Y directions. FIG. 7(c) shows a variation 703 of the dashed line 702. The images of the darker colored segments of the reference markers are used for an image processing system to eliminate image distortions, align and combine sub-images when the stationary image is of substantially light color. It is important that the reference grid lines on the at least partially transparent platform has at least two contrast colors. The images of the standard white colored segments 702a and 703a of the reference patterns are used customarily by the image processing system for shading correction and for providing references when the stationary image is of substantially dark color.

Figure 8:
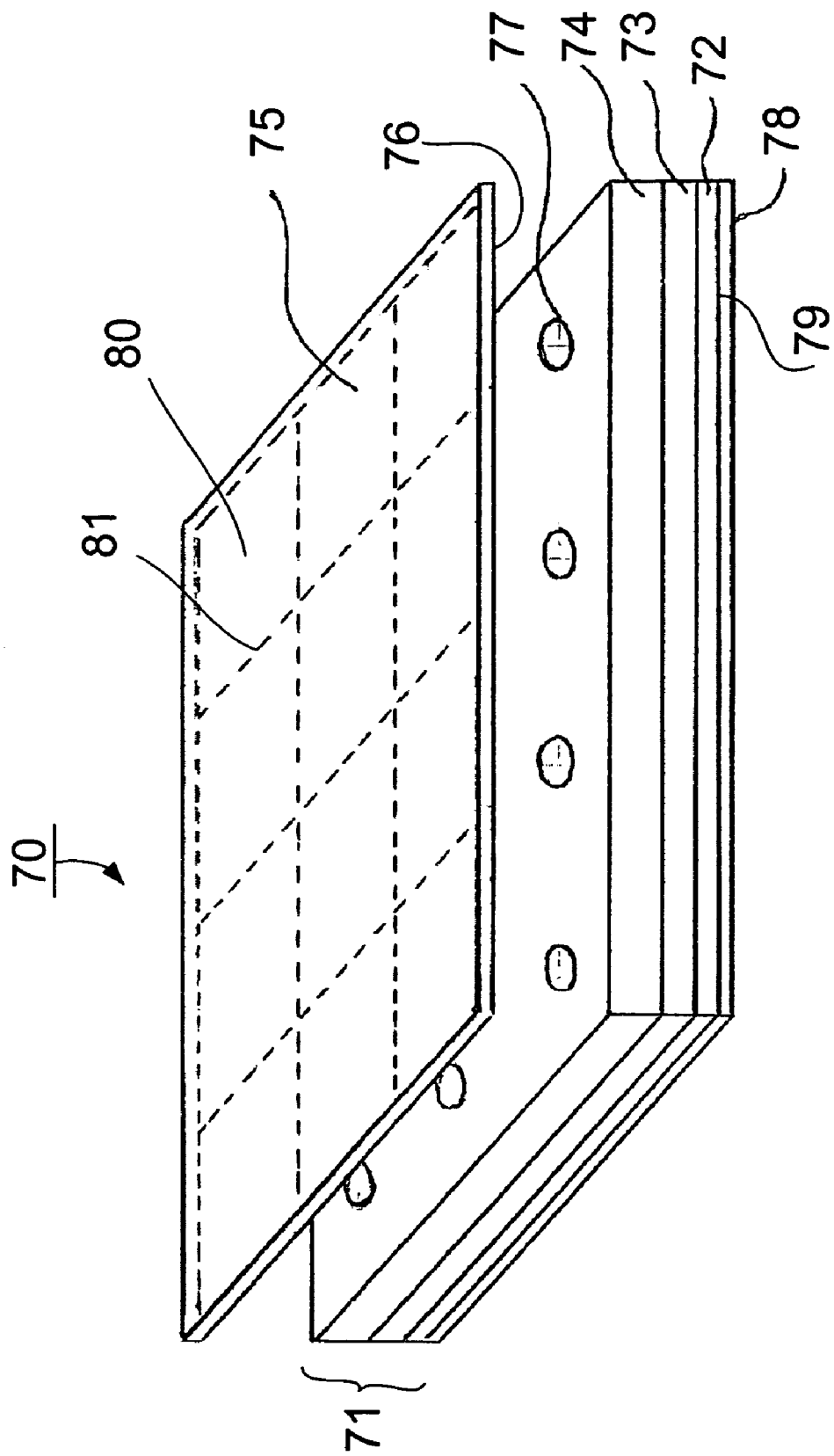
FIG. 8 shows schematically a perspective view of an optical imaging device according to one embodiment of the present invention.

FIG. 8 depicts a scanning portion 70 of another embodiment of the present invention. An at least partially transparent platform 80 has a top surface 75 where an object or stationary image such as a document is placed, an opposite, bottom surface 76, and reference lines 81. Anti-reflective coating can be applied to the bottom surface 76 to reduce the reflection from the bottom surface 76 of the at least partially transparent platform 80. An illuminating plate 71 comprises of at least one light source (not shown) on one side of the scanning portion 70, a base supporting layer 78, a light guiding layer 72 made of clear transparent glass or plastics and positioned on the base supporting layer 78, a light diffuser layer 73 positioned on the light guiding layer 72, and a light aligning layer 74 positioned on the light diffuser layer 73. The scanning portion 70 depicted here resembles the embodiment of the present invention shown in FIG. 2, where an array of imaging heads is used. A number of openings 77 are formed on the light aligning layer 74, as shown in FIG. 8, which are adapted for receiving corresponding imaging headd (not shown) therein. The document is placed on the top surface 75 of the at least partially transparent platform 80. Reference grid lines 81 are formed on the bottom surface 76, or substantially near the bottom surface 76 of the at least partially transparent platform 80. The white area shown in FIG. 4 is also formed on the same plane as the reference lines 81 (not shown). The support plate 78 is utilized here for mechanical strength. If the layers 72 and 73 have sufficient strength to support themselves and not to deform under normal use, the layer 78 can be removed. In this case, a rugged reflective surface should be formed on the bottom of the light guiding layer 72 for reflecting illuminating light upwards. Alternatively, if the diffuser layer 73 has enough physical strength, the light guiding layer 72 can be removed leaving an free space between the bottom of the diffuser layer 73 and the top surface of the supporting layer 78 or top surface of the bottom portion of the housing, where a rugged reflective surface may be formed on the top surface of the supporting layer 78 or top surface of the bottom portion of the housing. The light aligning layer 74 is used to direct the illuminating light in a predetermined direction onto the surface of the stationary image being scanned and to prevent the stray light from shinning into the eyes of a human operator. When the illuminating light intensity through the diffuser layer 73 is not too strong, the light aligning layer 74 may be omitted.

Figure 9:
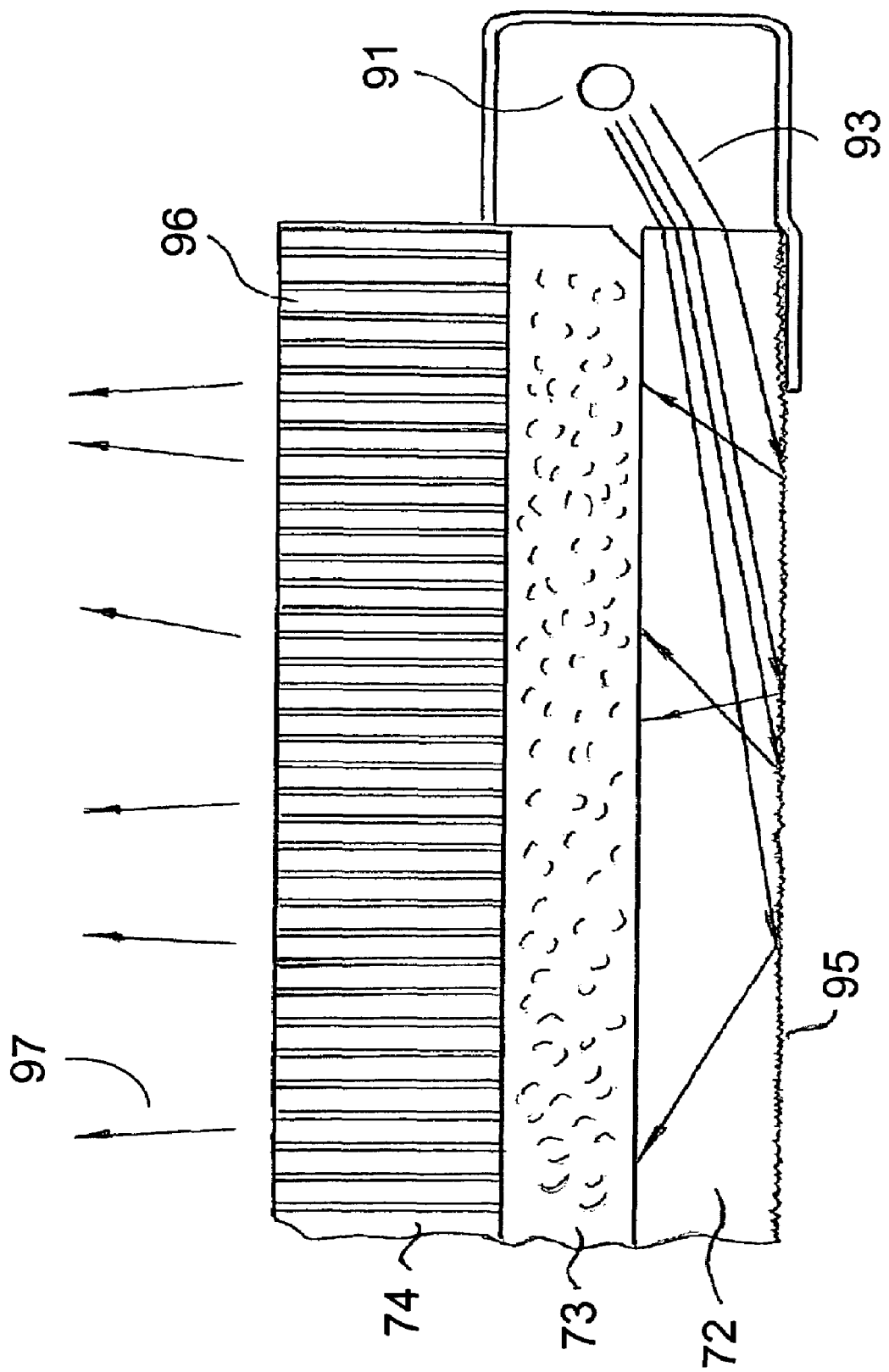
FIG. 9 shows schematically a side cross-sectional view of a portion of the optical imaging device, as shown in FIG. 8.

Referring to the FIG. 9, a partial side cross-sectional view of a scanning portion of the optical image device of FIG. 8 is shown in connection with a light source 91, a light guiding layer 72 with a rugged bottom surface 95 that is substantially reflective, a diffuser layer 73, and a light aligning layer 74 containing various shaped light aligning elements 96. The structure allows relatively low-cost devices such as fluorescent light tubes to be used as a light source. Other area illuminating source, such as area LCD panel, may also be used. The light guiding layer 72 is a transparent plate of glass or plastics so as to allow illuminating light penetrating deeply into the light guiding layer 72 when the light source 91 is placed on the sides of the light guiding plate 72. In operation, a light 93 emitted from the light source 91 travels through the light guiding layer 72 and is reflected through the rugged surface 95 of the light guiding layer 72 to the diffuser layer 73 where the light is made more evenly over the entire scan area with the diffuser materials such as milk-colored semi-transparent plastic plate, or sanded glass. The light then is transmitted to the light aligning layer 74. The light aligning layer 74 is adapted for further aligning the light and directing it towards the stationary image to be scanned. When the light aligning layer 74 is used, the side edge within each "cell" or "hole" 96 of the light aligning layer 74 may be a light absorbing surface, such as in black color, to provide better protection of the eyes of human operators. The embodiment shown in FIG. 2 can be considered as a special case of the embodiment of FIG. 9, where all light guiding layer 72, light diffuser layer 73, and light aligning layer 74 are not presented.

Figure 10:
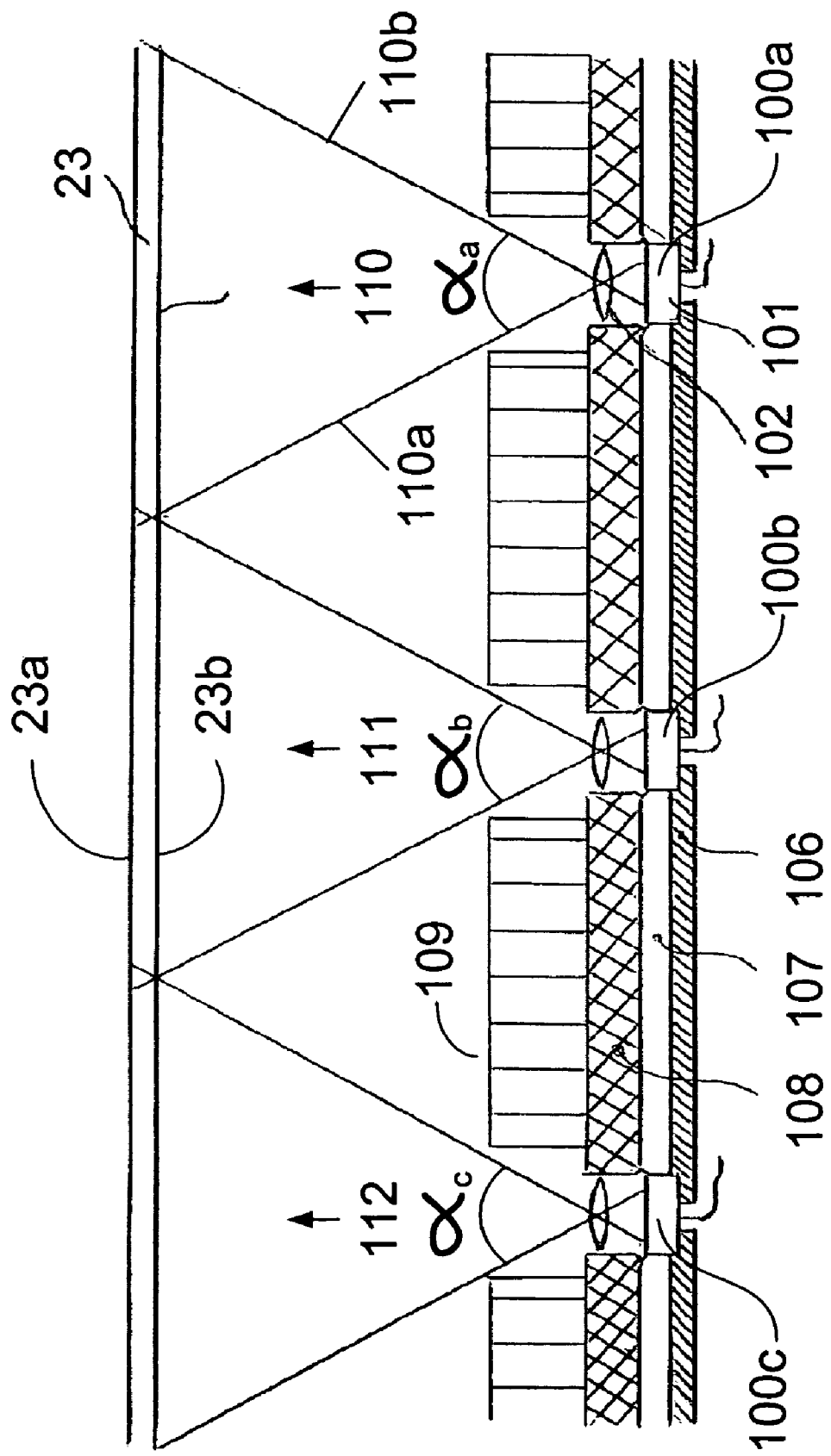
FIG. 10 shows schematically a side cross-sectional view of an optical imaging device according to another embodiment of the present invention.

Referring to FIG. 10, a partial side cross-sectional view of the optical image device of FIG. 8 is shown. In the embodiment, the optical image device has a base support plate 106, one or more imaging heads 100a, 100b, 100c mounted on the support plate 106, a light guiding layer 107, a light diffuser layer 108, a light aligning layer 109 having a light aligning structure, and an at least partially transparent platform 23 having a top surface 23a and a bottom surface 23b. A stationary image is placed on the top surface 23a of the at least partially transparent platform 23 for scanning. Its image is divided by the reference grid (not shown here) into many sub-images, such as 110, 111 and 112 in this exemplary embodiment. Each imaging head consists of at least one focusing lens (or lens assembly) 102 and an optical sensor 101 (or end point of an imaging waveguide). Each imaging head has a viewing angle. For example, imaging head 100a has a viewing angle $\alpha_a$ as defined by a first edge 110a and a second edge 110b for a sub-image 110. The focusing lens 102 is adapted for projecting the focused sub-image 110 onto the optical sensor 101. Likewise, imaging head 100b has a viewing angle $\alpha_b$ corresponding to sub-image 111, and imaging head 100c has a viewing angle $\alpha_c$ corresponding to the sub-image 112. The fields of view of different but neighboring imaging heads, such as the viewing angles $\alpha_a$, $\alpha_b$, and $\alpha_c$ are slightly overlapped. The supporting layer 106, the light guiding layer 107, the light diffuser layer 108 and the light aligning layer 109 all have openings formed therein to accommodate imaging heads.

If a large number of imaging heads are needed to build a scanner with large scanning area, a printed circuit board (PCB) can be utilized as a support plate, which provides connecting wires. In this embodiment, the imaging heads can be electronically connected to the PCB by plugging into electronic connectors, being soldered or by other appropriate means, as known to people skilled in the art. Some of these layers are optional, depending upon the quality requirement of the illuminating system of specific products. For even thinner profile of an imaging device or to use less imaging heads, wide angle lenses can be used corresponding the imaging heads.

Figure 11:
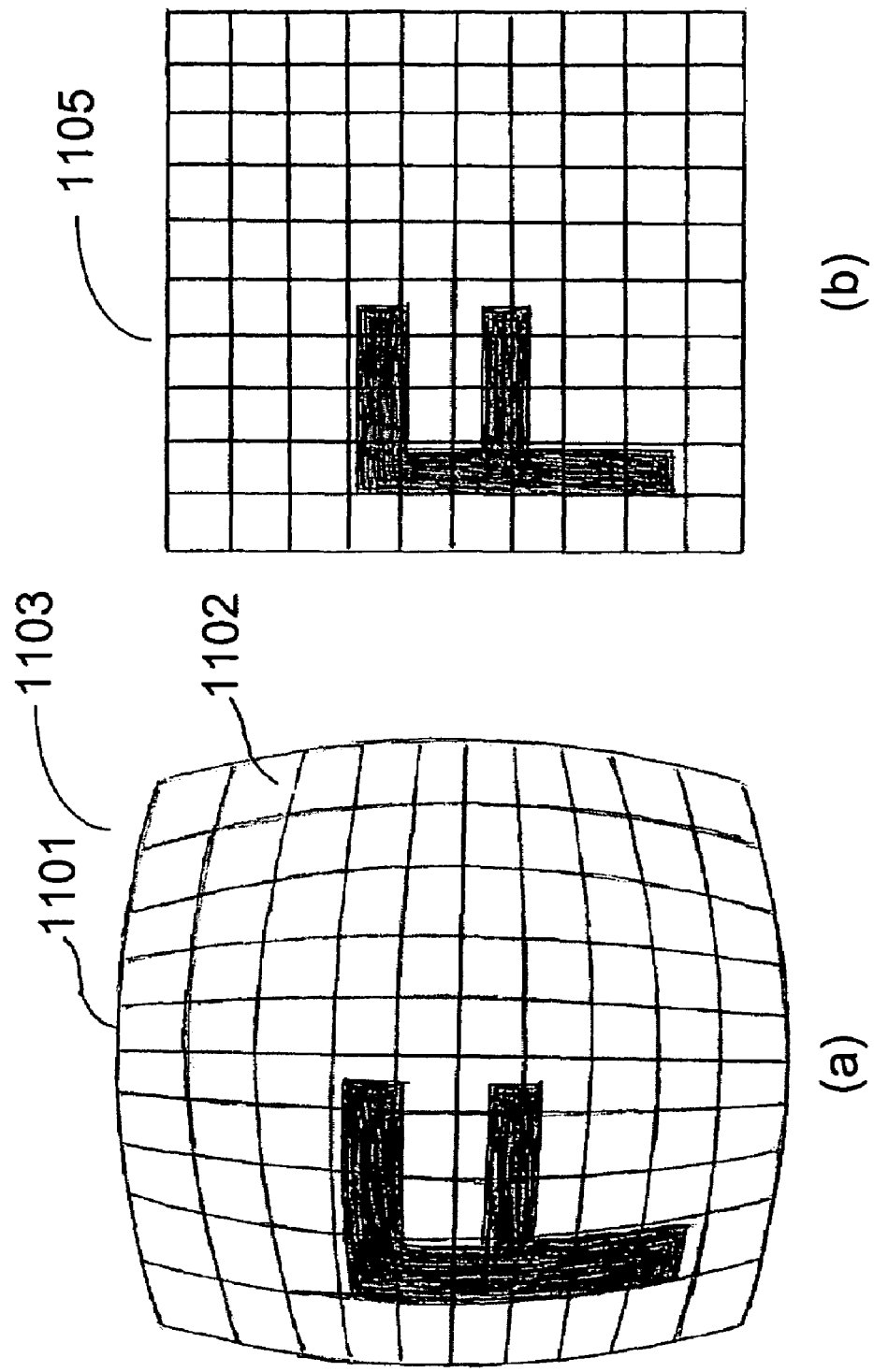
FIG. 11 shows schematically an image of a stationary image: (a) distorted image, and (b) processed image.

Referring now to FIG. 11, an example of an image distortion elimination process according to an embodiment of the present invention is shown. A reference grid line or marker 1101 on the white area forms the boundary of each grid (block) of a sub-image 1102. The amount of distortion on the partial image 1103 can be determined since the shape and position of the reference grid lines and markers are predefined and known to the image processing system. A corresponding final image 1105 after the sub-image combination and image distortion elimination processes is shown in FIG. 11(b).

Light aligning layers with different aligning structures that can be used as an alternative to the light aligning layer 74 in the embodiment as shown in FIG. 9 are given in FIGS. 12(a)-12(f). In the embodiment shown in FIG. 12(a), a light aligning layer 1200a has open cells 1202. The open cells 1202 may be formed in various forms. As shown in FIGS. 12(a)-12(e), the open cells 1202, 1203, 1204, 1205 and 1206 are formed in a square shape, a round shape, a oval shape, a hexagonal shape, and a triangular shape, respectively. The thickness of the vertical sidewall and the shapes of open cells determine the percentage of the illuminating light passing through the light aligning layer. In this regard, light aligning layers with configurations 1200b and 1200c block some part of the illuminating light towards the document, while light aligning layers with configurations 1200a, 1200d and 1200e allow almost 100% of the illuminating light to pass through towards the document, respectively. The light aligning layers with configuration 1200f uses optical fiber 1207. The fibers may be glued together by a less transparent material with a slightly smaller index so light inside the highly transparent waveguides can be kept within the waveguide themselves.

Figure 12:
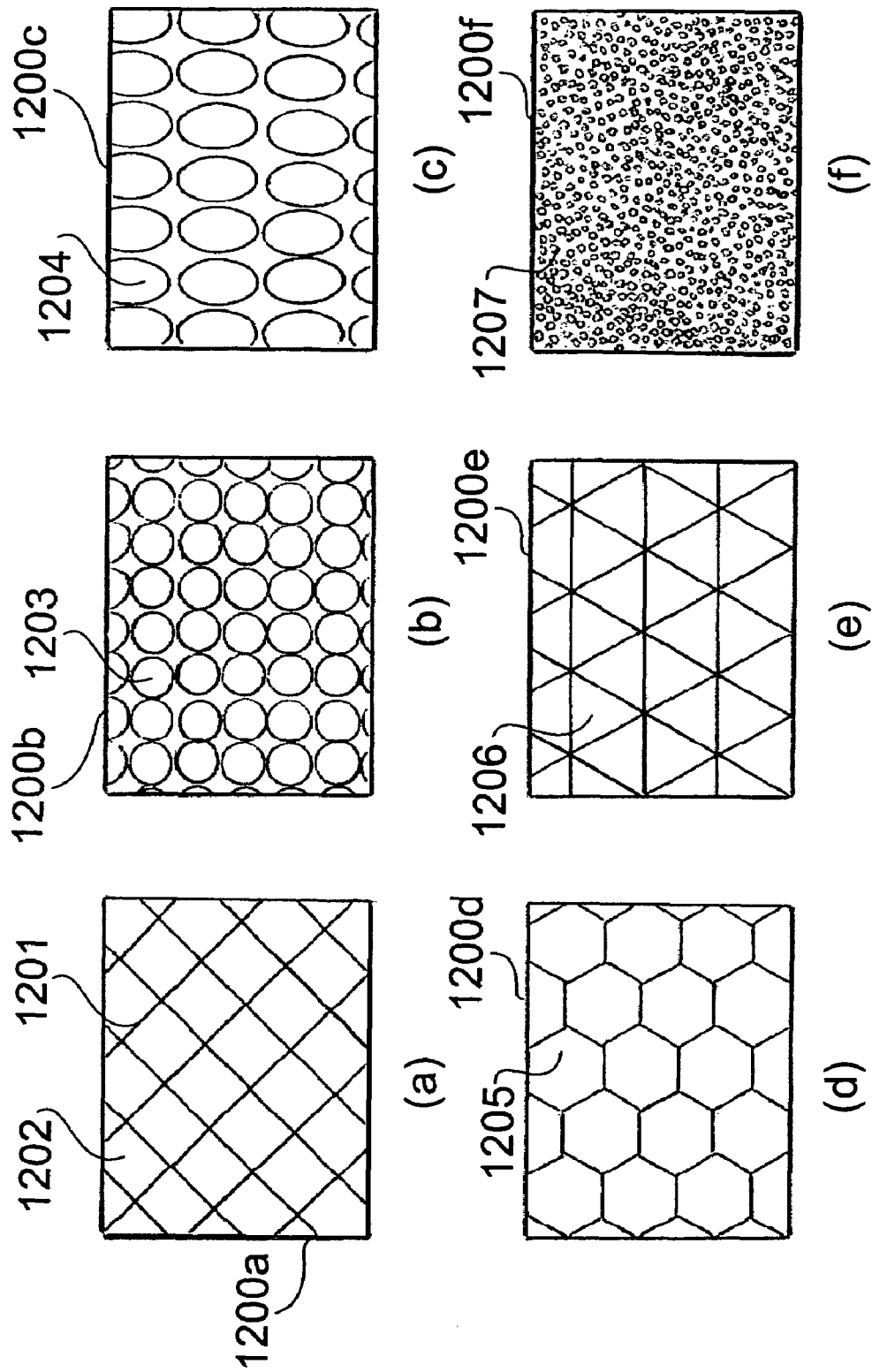
FIG. 12 shows schematically a top view of a structure pattern of a light aligning layer of an optical imaging device according to different embodiments (a)-(f) of the present invention.
Figure 13:
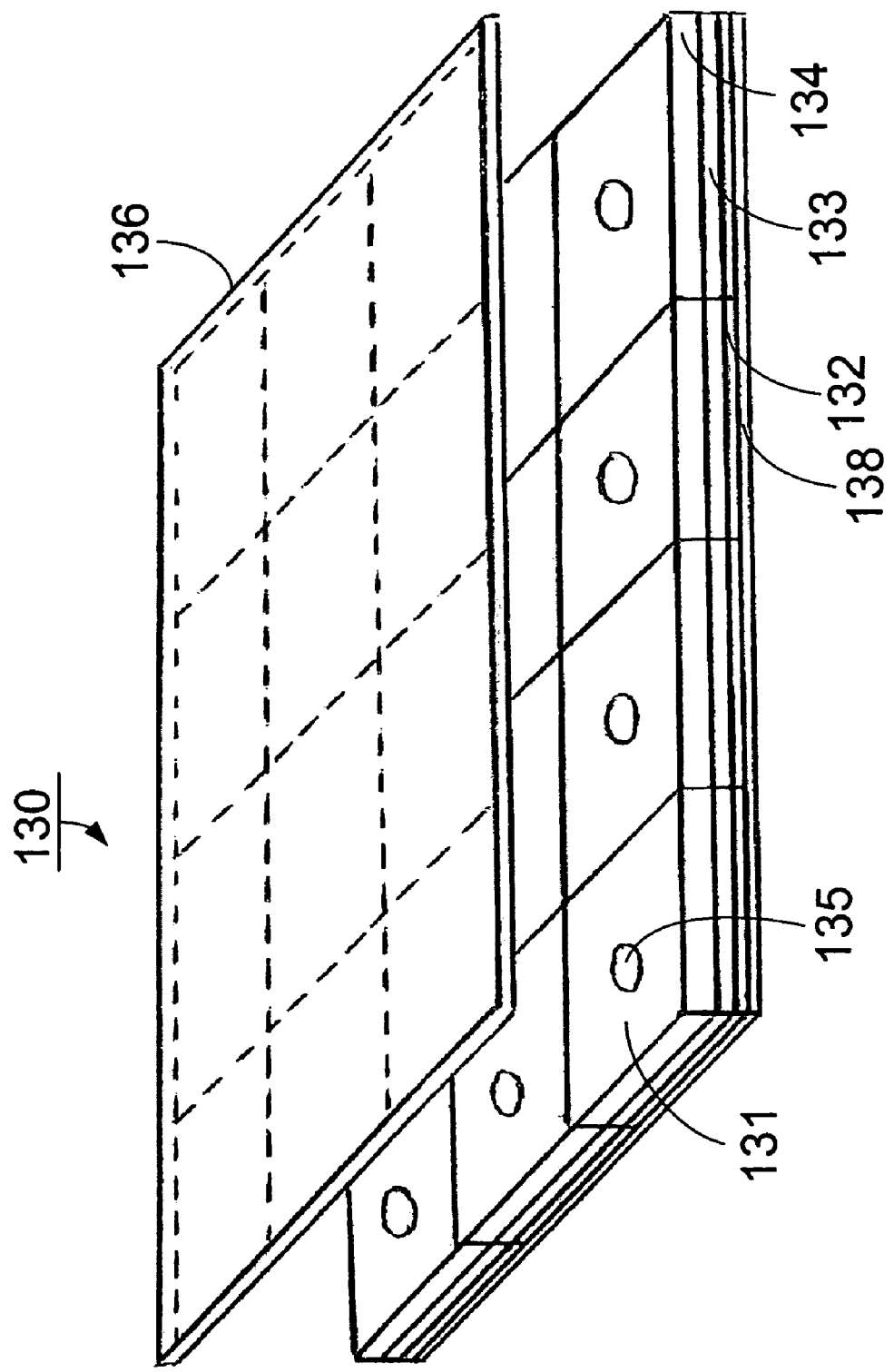
FIG. 13 shows schematically a perspective view of an optical imaging device having a plurality of imaging tiles according to one embodiment of the present invention.

Referring now to FIG. 13, a scanning portion 130 of an optical image device according to another embodiment of the present invention is shown. A major difference between this embodiment and the previously described embodiments is that this embodiment uses a modularized imaging head design. As shown in FIG. 13, an imaging tile (image assembly) 131 has a multilayer structure: a light guiding layer 132 having a first surface, an opposite, second surface and a lateral, third surface joined by the first surface and the second surface, a light diffuser layer 133 deposited on the first surface of the light guiding layer 132, and a light aligning layer 134 deposited on the light diffuser layer 133. In one embodiment, the third surface 132a of the light guiding layer 132 has an anti-reflective coating. One or more openings 135 are formed in the imaging tile 135. Each opening 135 is adapted for receiving an optical sensor and a corresponding focusing lens. The imaging tile is mountable to a supporting layer 138. The supporting layer 138 and the at least partially transparent platform 136 are not modularized and are in the size of all imaging tiles combined, with reference grids marked approximately the boundaries of the imaging tiles. As shown in FIGS. 13, 12 imaging tiles 131 are utilized. However, any number of imaging tiles can be used to practice the present invention to meet the individual needs of a user.

The utilization of such imaging tiles further makes the design of an optical imaging device more flexible with identical components and serves to reduce the manufacturing cost. Any number of imaging tiles can be used to construct an optical imaging device, as little as two or as many as any scanner design requires. The more image tiles are used, the more "flat" the physical profile of the scanner will be.

Figure 14:
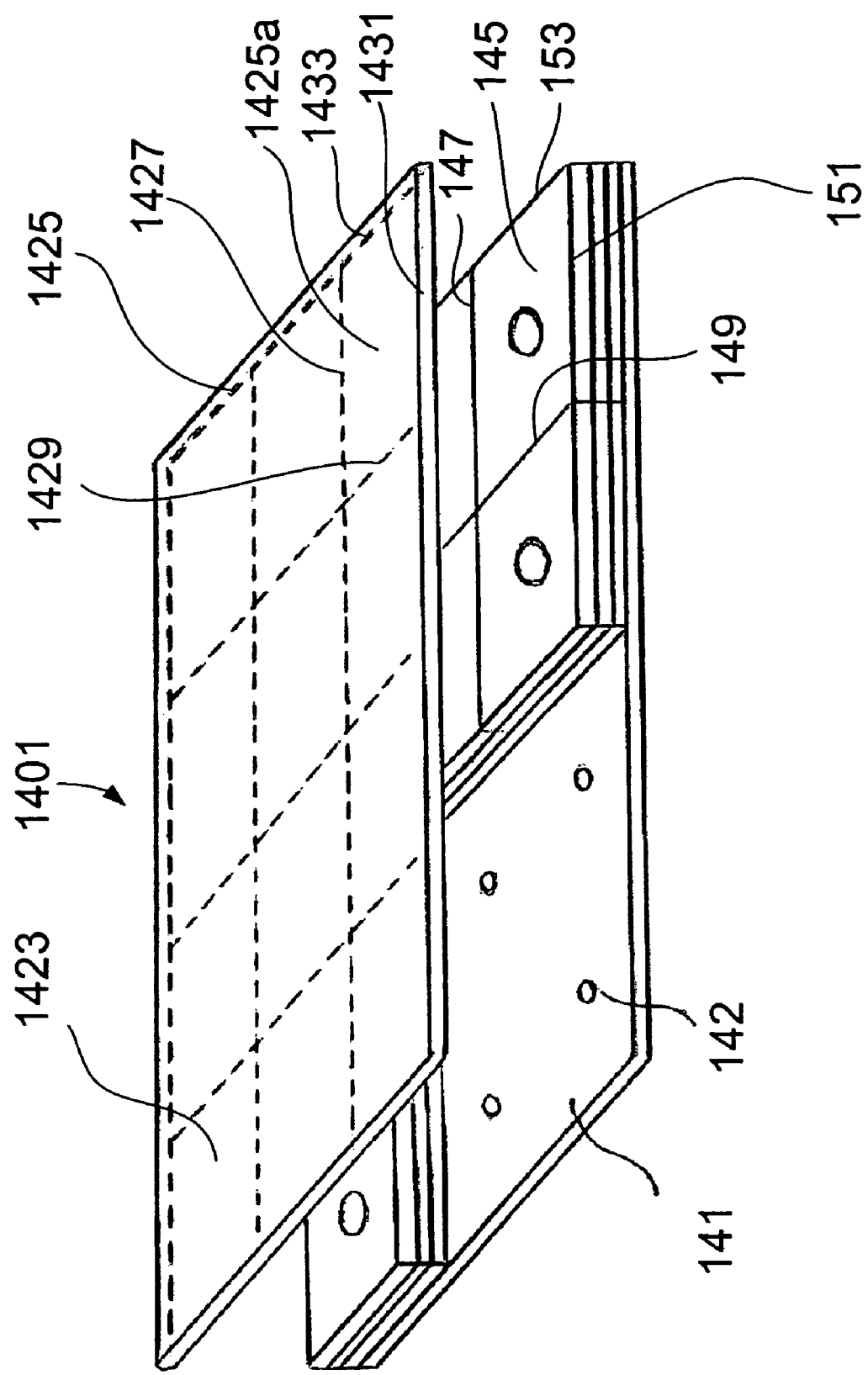
FIG. 14 shows schematically a perspective view of the optical imaging device shown in FIG. 13, with an assembling process.

In FIG. 14, a scanning portion 1401 is shown with some image tiles removed from a supporting layer 141. As formed, platform 1423 has a reference grid 1425 corresponding to the pattern of the imaging tiles. For example, element 1425a of the reference grid 1425 with reference lines 1427, 1429, 1431 and 1433 is corresponding to imaging tile 145 with tile boundary edges 147, 149, 151 and 153, respectively. Openings 142 formed on the supporting layer 141 allow wire connection from the optical sensor to transfer electronic signal to a processor (not shown).

Figure 15:
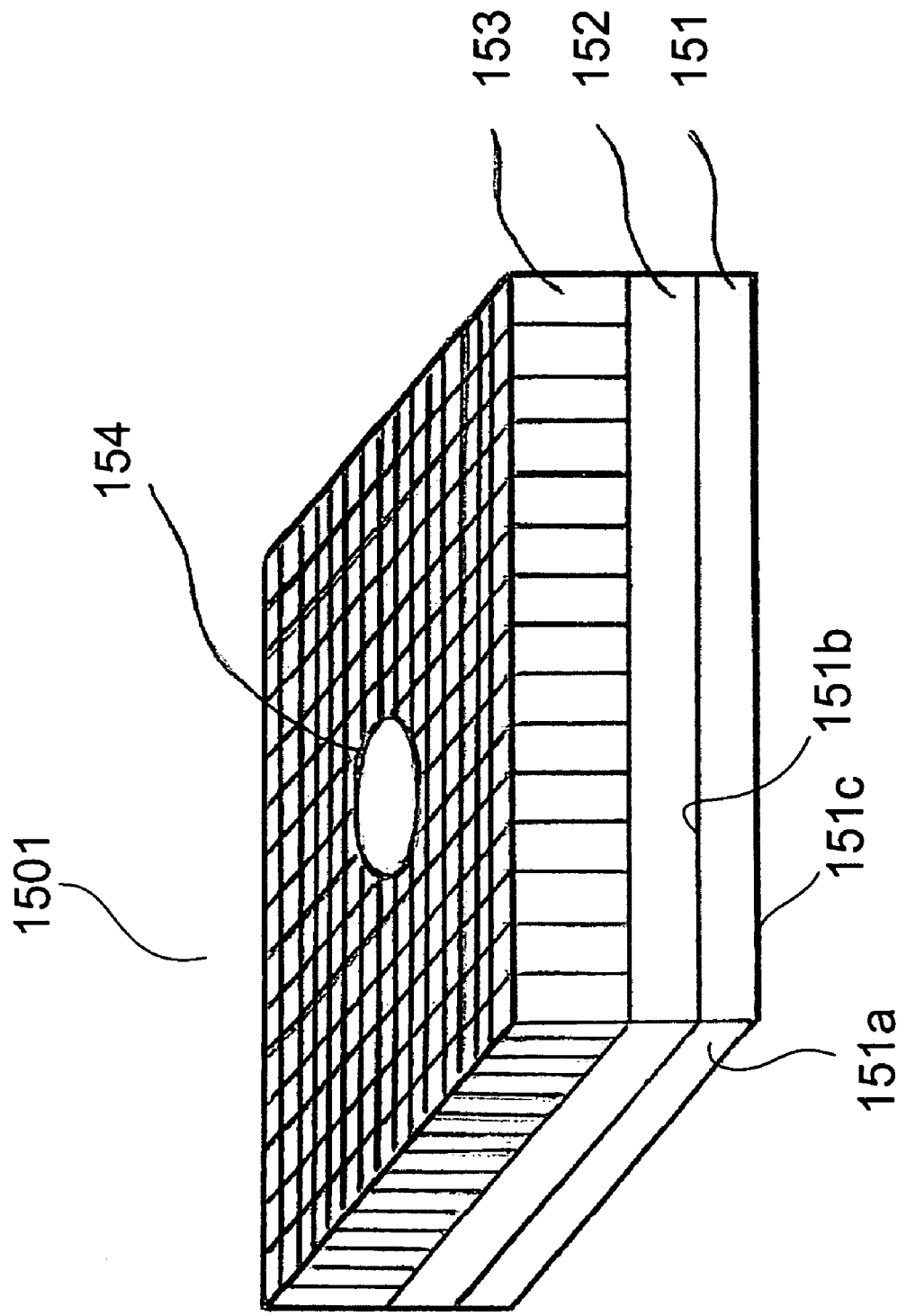
FIG. 15 shows schematically a perspective view of an imaging tile according to one embodiment of the present invention.

An imaging tile 1501 is shown in FIG. 15. The imaging tile 1501 has a light guiding layer 151 having a first surface 151b, an opposite, second surface 151c and a lateral, third surface 151a joined by the first surface 151b and the second surface 151c, a light diffuser layer 152 deposited on the first surface 151b of the light guiding layer 151, and a light aligning layer 153 deposited on the light diffuser layer 152. In one embodiment, the lateral surface 151a of the light guiding layer 151 has an anti-reflective coating. One or more opening 154 is formed through all these three layers adapted for receiving optical sensor therein to capture the sub-image corresponding to this image tile. As formed, the lateral surface 151a of the light guiding layer 151 are transparent to allow light pass through. Optionally, an anti-reflective coating may be applied on the lateral surface 151a of light guiding layer 151 to allow uninhibited passing of the light between imaging tiles when several imaging tiles are assembled together to form a scanning portion for an imaging device.

The imaging head can be made as an integral part of the imaging tile, or a separate part that is mountable to the imaging tile. An imaging tile may have one or more imaging heads depending on the design of a particular scanning portion for an imaging device.

Figure 16:
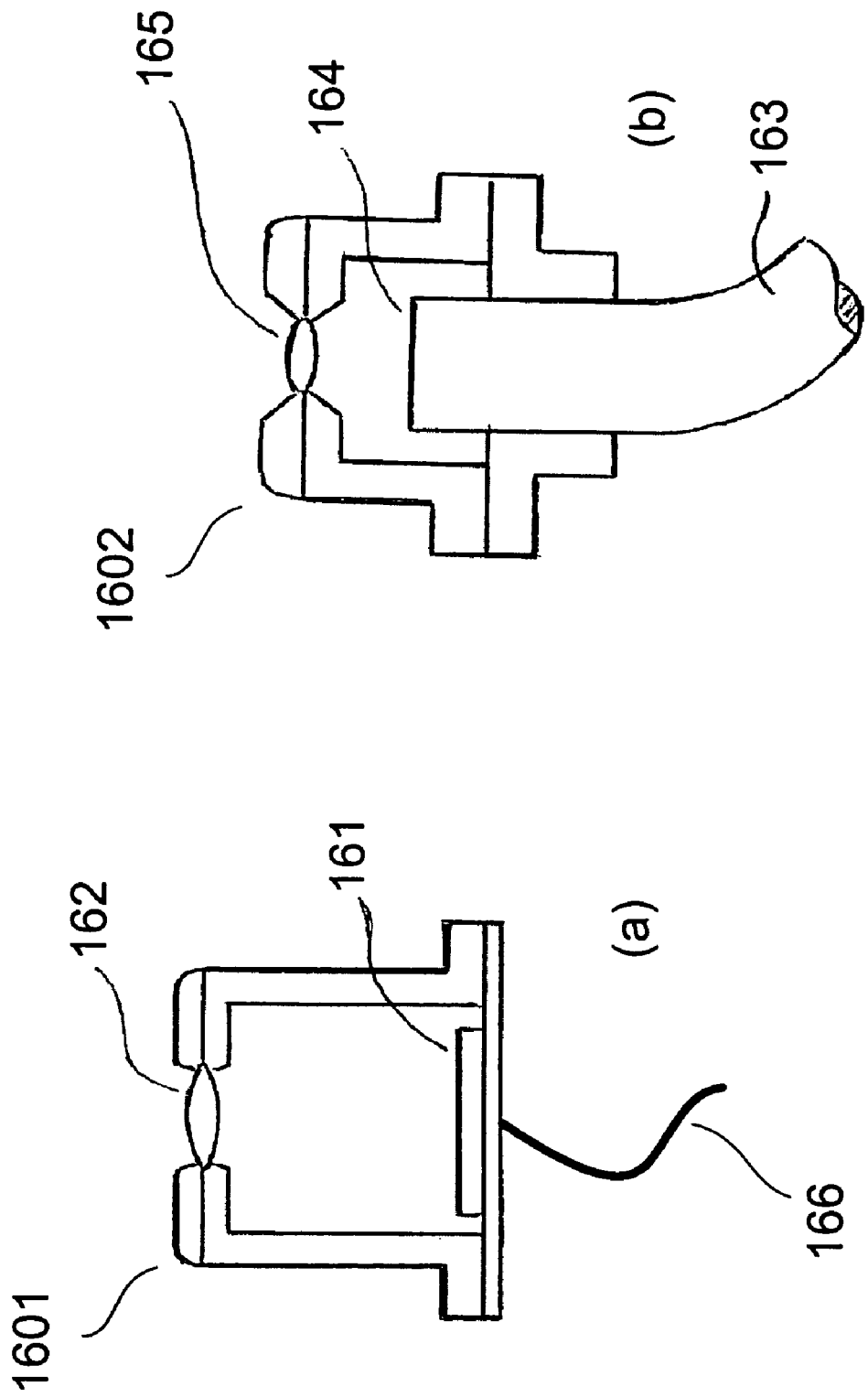
FIG. 16 shows schematically a side view of an imaging head: (a) according to one embodiment of the present invention, and (b) according to another embodiment of the present invention.

Referring now to FIG. 16, two types of imaging heads that can be used to practice the present invention are shown. An imaging head assembly 1601 shown in FIG. 16(a) has a focusing lens or lens assembly 162 and an area optical sensor 161. The focusing lens or lens assembly 162 projects/focuses a corresponding sub-image or image onto the area optical sensor 161, which generates signal in response through wire connection 166 transfers same to an image processing system. As shown in FIG. 16(b), an imaging head assembly 1602 has a focusing lens or lens assembly 165 and a bundle of imaging waveguides 163 with a first end 164. The focusing lens or lens assembly 165 projects/focuses a corresponding sub-image or image onto the first end 164 of the bundle of imaging waveguides 163, which generates corresponding optical signal and through the bundle of imaging waveguides 163 transfers same to an image processing system.

Figure 17:
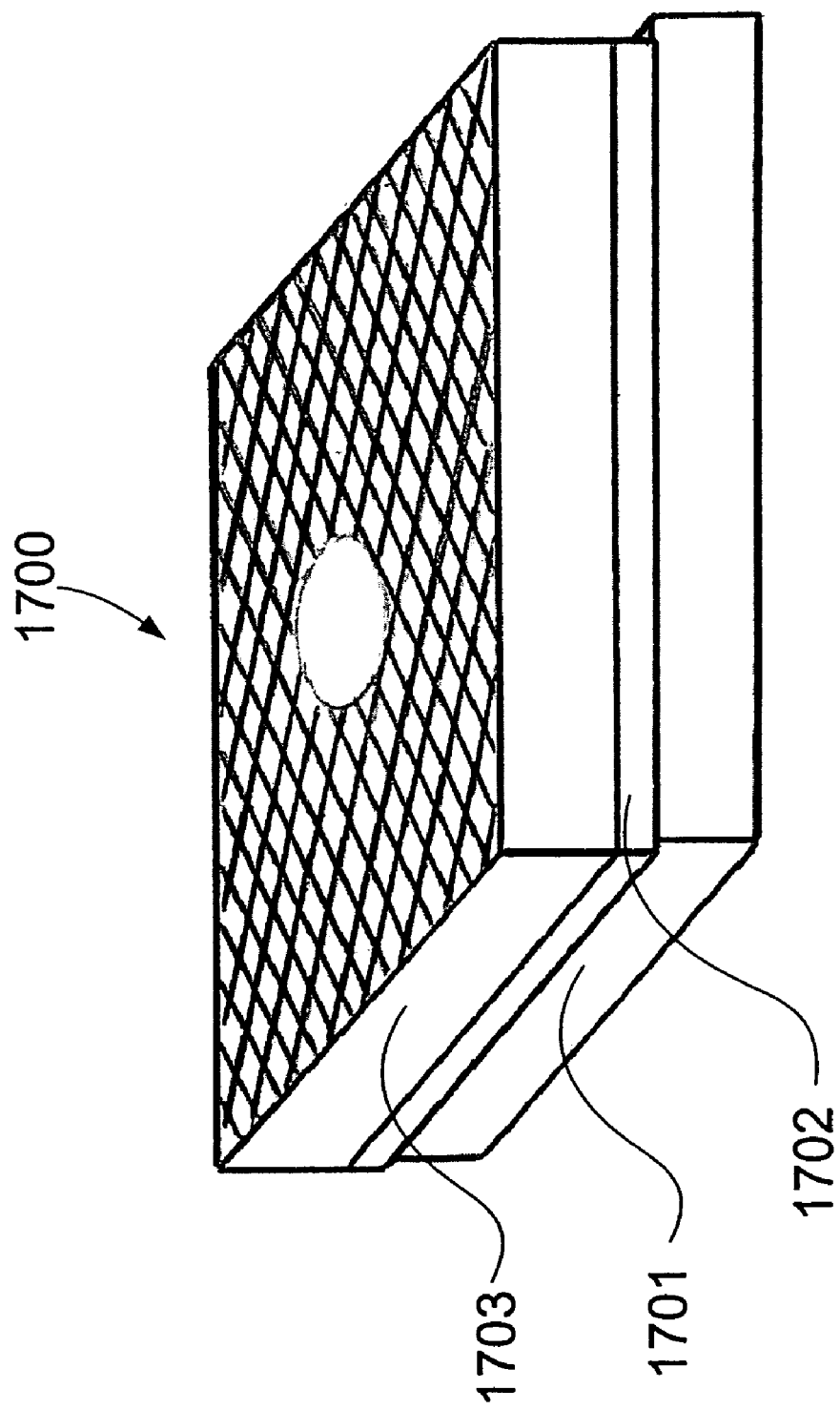
FIG. 17 shows schematically a perspective view of an imaging tile according to another embodiment of the present invention.

An alternative imaging tile 1700 according to another embodiment of the present invention is shown in FIG. 17. The imaging tile 1700 has a structured side surface. Namely, the side surface of a diffuser layer 1702 is flush with a corresponding side surface of a light aligning layer 1703 but not with a corresponding side surface of a light guiding layer 1701. The configuration may prevent a stray light from shining through the diffuser layer 1702 onto the stationary image through the gap between imaging tiles. The gaps may be caused by imperfections introduced by the manufacturing process of imaging tiles.

Figure 18:
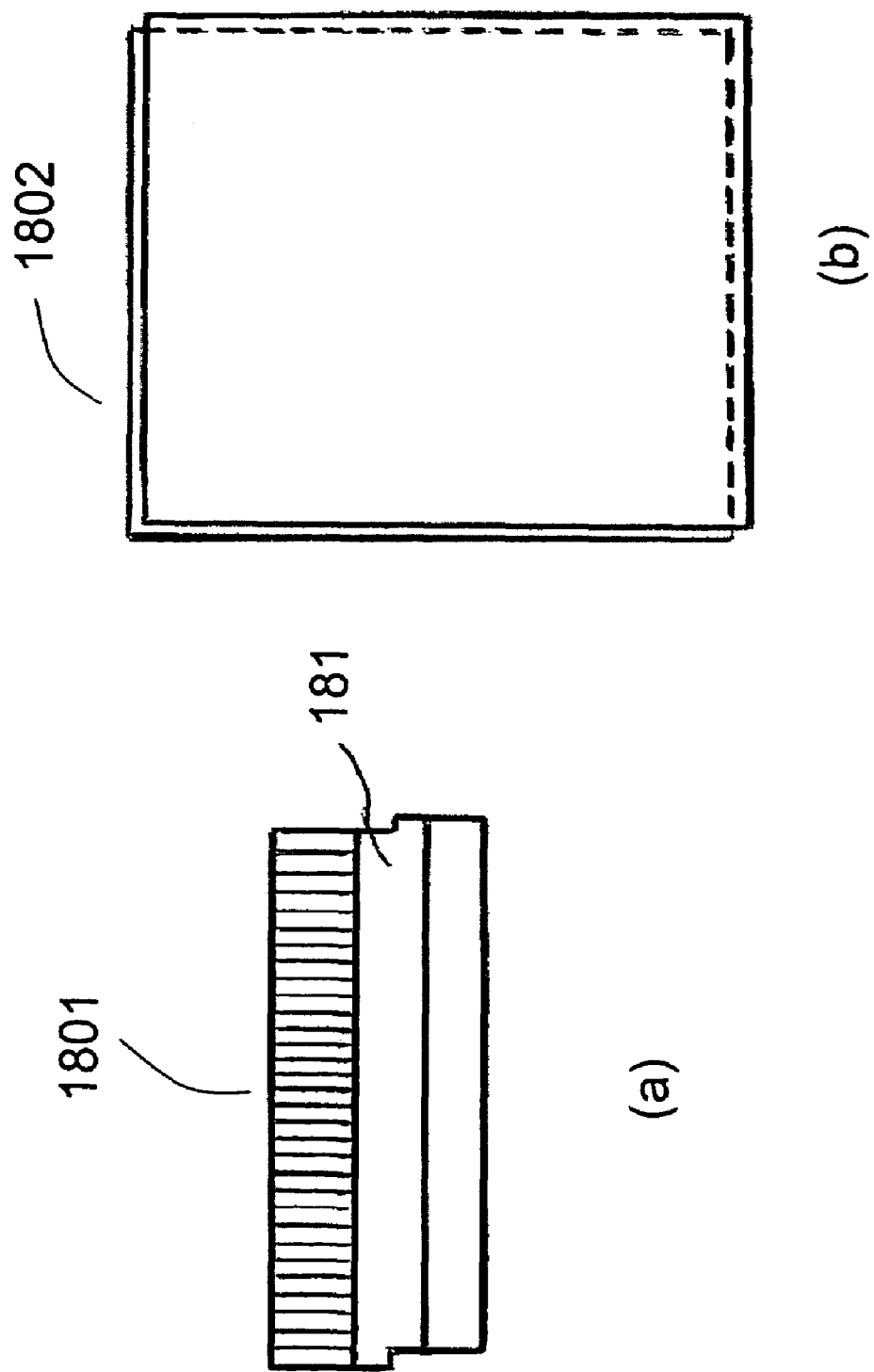
FIG. 18 shows schematically the imaging tile shown in FIG. 17: (a) a side view, and (b) a bottom view.

The zigzag shape of the side surface of the imaging tile reduces the requirement on the mechanical precision of the image tile, tolerates more surface irregularity, and lowers manufacturing cost. Furthermore, imaging tiles having zigzag shaped side surfaces can be easy to assemble and be fixed up in the scanner. An imaging tile 1801, where a diffuser layer 181 has a zigzag shaped side surfaces, is shown in FIGS. 18(*a*) and (*b*), respectively.

Figure 19:
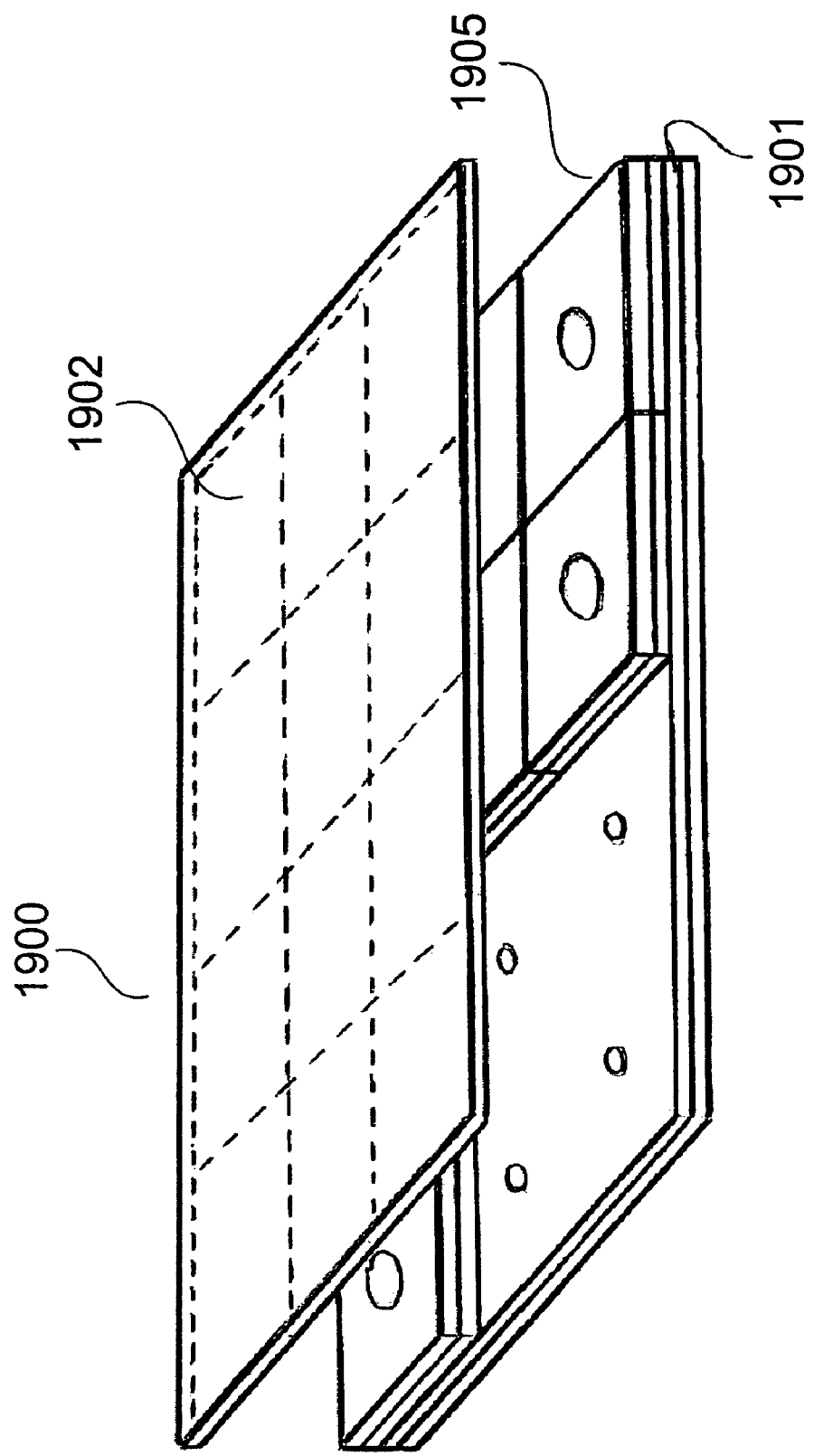
FIG. 19 shows schematically a perspective view of an optical imaging device with an assembling process according to another embodiment of the present invention.

A scanning portion 1900 according to another embodiment of the present invention is partially shown in FIG. 19. Light guiding layer 1901 is formed as one piece for the entire scanner and is not part of the imaging tiles. The size of the at least partially transparent platform 1902 is substantially equal to the size of the light guiding layer 1901. This configuration allows more efficient illuminating light passing through the light guiding layer 1901.

Figure 20:
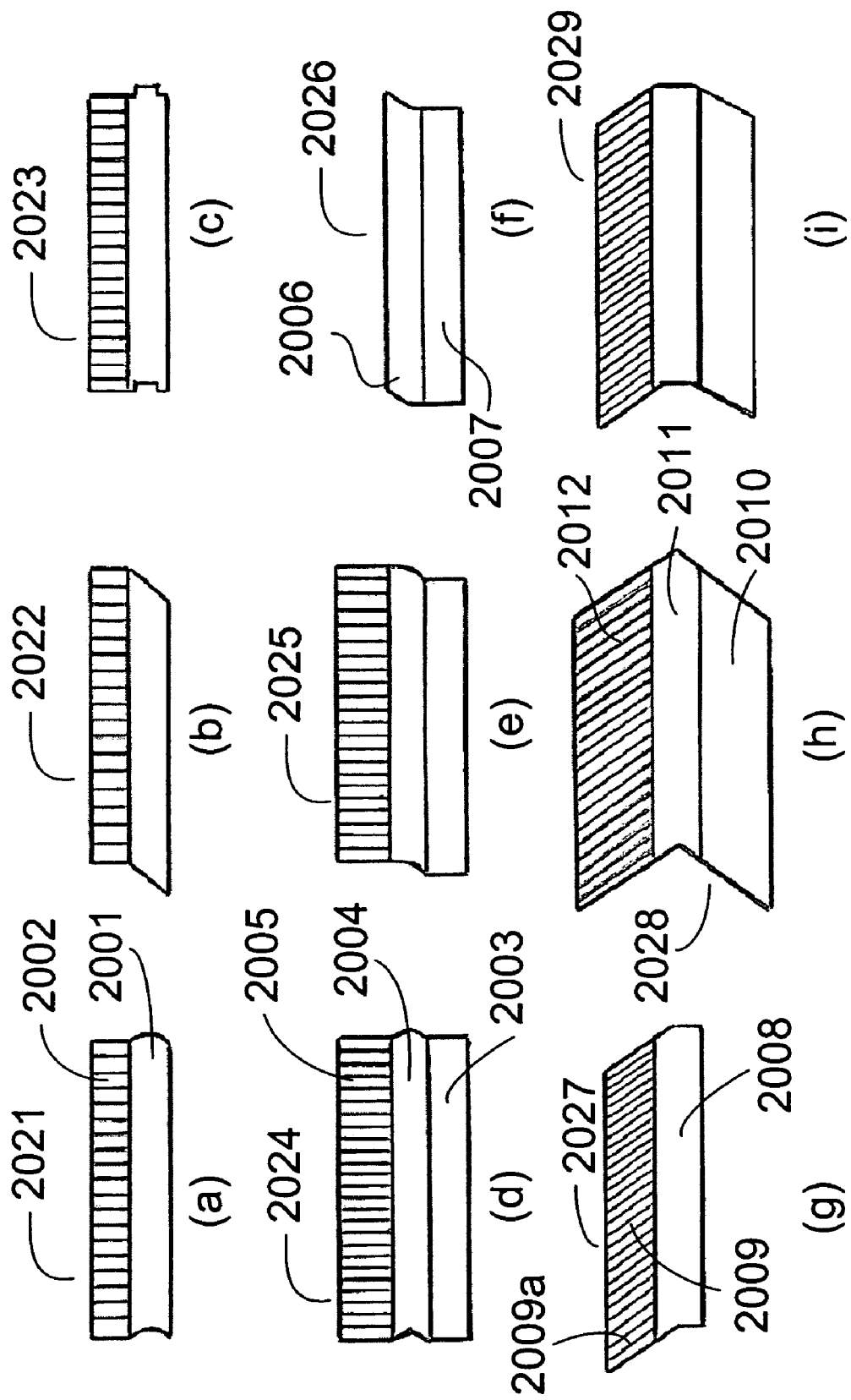
FIG. 20 shows schematically a side view of an imaging tile according to various embodiments (a)-(i) of the present invention.

Several additional types of imaging tile structures that can be used to practice the present invention are shown in FIG. 20(*a-i*), respectively. Imaging tiles 2021, 2022, and 2023 as shown in FIGS. 20(*a*), (*b*), and (*c*) each has only two layers: a light diffuser layer 2001 and a light aligning layer 2002. These imaging tiles may be used in the embodiment as shown in FIG. 19. These imaging tiles however have different shaped side surface.

Imaging tiles 2024 and 2025 as shown in FIGS. 20(*d*) and (*e*) each has three layers: a light guiding layer 2003, a light diffuser layer 2004, and a light aligning layer 2005. These imaging tiles may be used in the embodiments as shown in FIG. 13 and FIG. 14.

Imaging tile 2026 as shown in FIG. 20(*f*) has only two layers: a light guiding layer 2007 and a light diffuser layer 2006. Imaging tiles 2027, 2028 and 2029 as shown in FIGS. 20(*g*), (*h*), and (*i*) each has a light aligning layer with non-vertical light aligning direction. In FIG. 20(*g*), the imaging tile 2027 is shown to have a light diffuser layer 2008 and a light aligning layer 2009 with a non-vertical light aligning direction. The imaging tiles 2028 and 2029 as shown in FIGS. 20(*h*) and (*i*) each has three layers: a light guiding layer 2010, a diffuser layer 2011, and a light aligning layer 2012 with a non-vertical or tilted light aligning direction.

The shapes, sizes and configurations of the imaging tiles of the present invention are not limited to the exemplary embodiment described above. They can have three layers configuration with a light guiding layer, a light diffuser layer and a light aligning layer, or two-layer configuration, or a one-layer configuration. The imaging tiles can be large or small. They can have any geometric shape as long as they can be combined to form a large area of certain shape for the scan area of an optical imaging device. An imaging tile may or may not include a light aligning layer with vertical, near vertical, or non-vertical light aligning direction. One common features of these imaging tiles is the capability of blocking possible light leaking towards the stationary image through gaps between imaging tiles.

Figure 21:
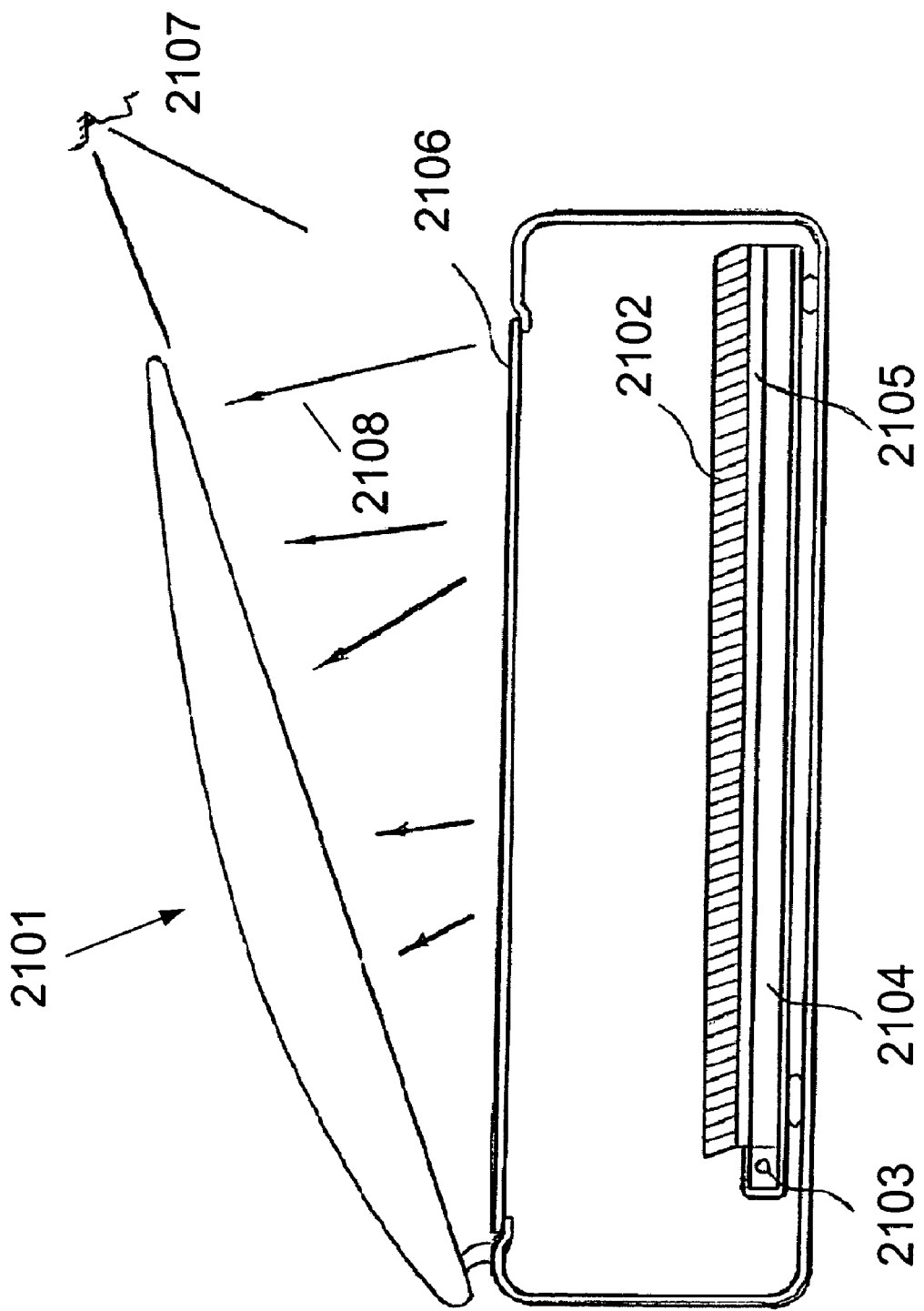
FIG. 21 shows schematically a side cross-sectional view of an optical imaging device according to one embodiment of the present invention.

An optical imaging device 2101 according to one embodiment of the present invention is shown in FIG. 21, where a non-vertical light alignment device 2102 is used. The illuminating light is emitted from a light source 2103, and travels through a light guiding layer 2104, a light diffuser layer 2105 and a light aligning layer 2102 to illuminate a stationary image or document placed on a platform 2106, which is at least partially transparent. Due to the utilization of the non-vertical light alignment device, the illuminating light 2108 escaped from the platform 2106 will not directly shine into the eyes of a human operator 2107.

Figure 22:
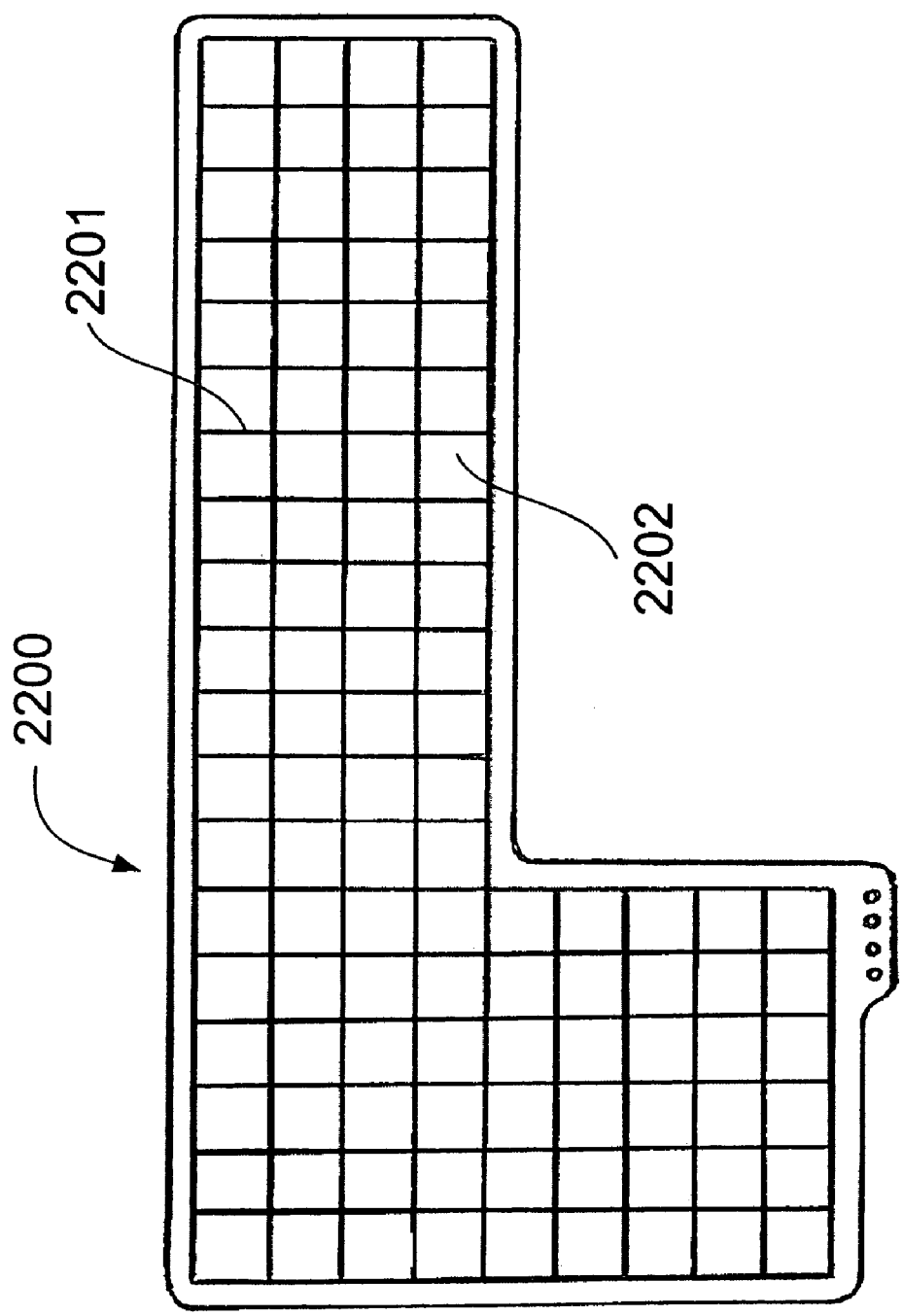
FIG. 22 shows schematically a top view of an optical imaging device according to another embodiment of the present invention.

As shown in FIG. 22, using imaging tiles can provide a user the flexibility to form an optical imaging device with desired size and shape. An L-shaped optical imaging device 2200 is shown with reference grid 2201 and imaging tiles 2202. The L-shaped optical imaging device can be useful in engineering work where sometimes very long or odd-shaped documents need to be scanned.

Figure 23:
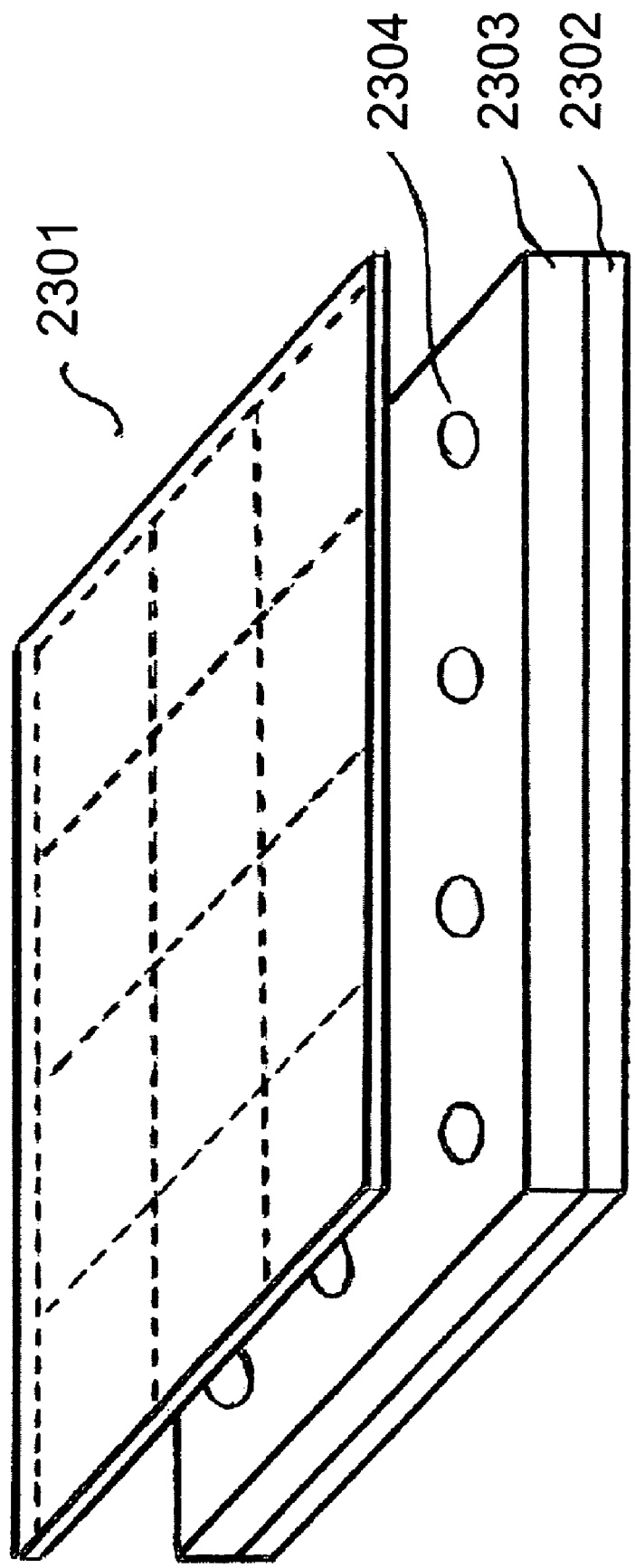
FIG. 23 shows schematically a perspective view of an optical imaging device according to an alternative embodiment of the present invention.

Different types of light sources including flat-panel light source such as a flat LCD panel can be used to illuminate the document. As shown in FIG. 23, an optical imaging device 2301 has a flat-panel light source 2302. Openings 2304 are formed therein for receiving optical sensors (not shown). Optionally, a light alignment device 2303 may be placed on top of the flat-panel to reduce the amount of illuminating light that might be seen by a human operator.

The structure of illuminating light board with imaging heads such as shown in FIGS. 8, 13, 19, and 23 can be used alone, respectively. In other words, an optical imaging device may have only the illuminating light board but not the part "under the glass reference line". In this case, the imaging system will need to be calibrated before the optical imaging device leaves the manufacturing facility and the manufacturing precision should be high. Among other choices, a way to calibrate the imaging system is to place a gridline reference board on top of the scanning area of the optical imaging device, facing down, and have its picture scanned by the optical imaging device. The sub-images from different imaging heads provide the basis for calibrating the imaging system for shading correction, distortion elimination, and sub-images combination.

Focusing lens or lens assembly with wide field of view or fish eye lenses may be used in imaging heads. Using such lenses may reduce the number of imaging heads used as compared to using normal lenses for a given scanning area.

With respect to a particular application, it may not be necessary to use all imaging heads to capture their respective sub-images for a document to be scanned. In certain modes, for example, an optical imaging device for a large engineering use may selectively use only a few of its imaging heads to scan small stationary images and more or all of its imaging heads for large stationary images.

When scanning small documents, if some of the imaging heads are turned off, their corresponding light sources may be turned off as well if multiple light sources, for example, multiple fluorescent light tubes, or multiple LED assemblies, or multiple flat-panel LED lights, are used. This will reduce energy consumption and reduce the mount of light escaping the scan area during imaging for more comfortable operation.

It is also possible that the present invention can be practiced in a "piece-wise" mode. In this mode, one or more light sources (LED light panels, fluorescent tubes, etc.) are lighted up and corresponding imaging heads capture the sub-images of the document at the areas that are lighted up. Then, one or more other light sources are lighted up for another sub-image, and corresponding image heads capture this sub-image. This process is repeated until the optical imaging device captures the image of entire stationary image.

Figure 24:
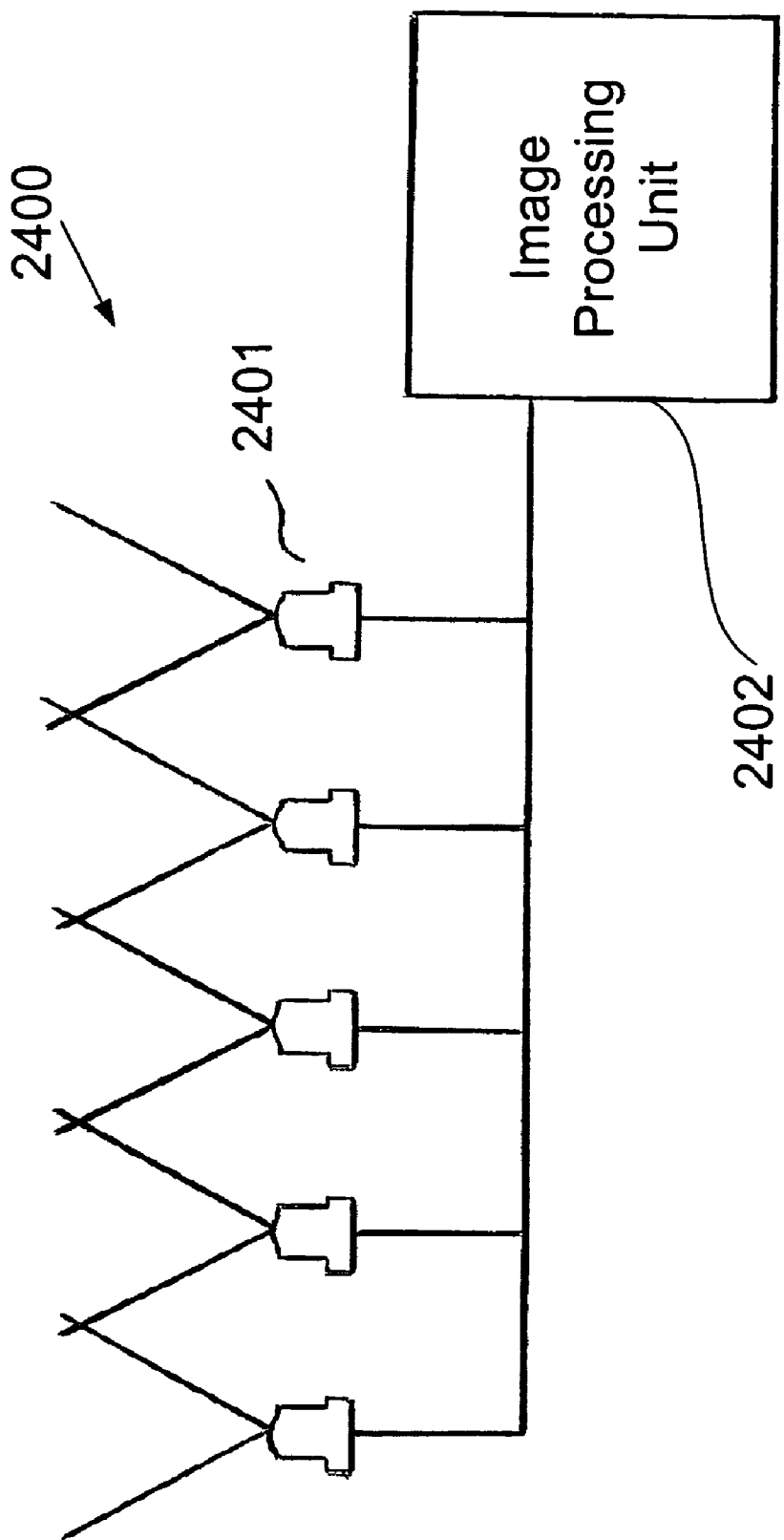
FIG. 24 shows schematically a configuration of a plurality of imaging heads communicating with an image-processing unit according to one embodiment of the present invention.

In many imaging devices, a device such as a frame-grabber or an image processing unit is used to receive a signal from an optical sensor to assemble the electronic signal into an image file. If multiple sensors are used, it is costly for each optical sensor to be connected to its own frame-grabber. Referring to FIG. 24, an optical imaging device 2400 according to one embodiment of the present invention has multiple imaging heads 2401 that are connected to a same frame-grabber (or an image processing unit) 2402. In operation, each sensor connecting to the frame-grabber 2402 is exposed in a slightly different time interval to allow the frame-grabber as well as other parts of the imaging-processing unit 2402 to process each sub-image one at a time, and then to combine these sub-images into a substantially complete image. Many other means such as USB connections or the like may be used to sequentially transfer these sub-images into the frame-grabber or the image processing unit 2402.

Alternatively, imaging waveguides may be used to capture the sub-images of the same document. Such an imaging head using a single waveguide or a bundle of waveguides is shown in FIG. 16(*b*).

Because of the simplicity of the waveguide imaging head, utilizing the waveguide imaging head may have certain advantages over the optical sensor imaging heads, such as lower cost, and higher reliability. Under certain manufacturing conditions (mass production above certain quantity level, for example), the manufacturing cost per waveguide imaging head may be lower than the manufacturing cost per optical imaging sensor. For the same reason, the reliability of the waveguide imaging head may be higher than that of the optical imaging sensor.

In general, because the waveguide imaging head can be made, smaller than optical imaging sensor, a scanning devices made with optical fiber imaging heads can have more imaging heads than the devices made with optical imaging sensors, further reducing the vertical dimension. Therefore, the optical imaging devices made with optical fiber imaging heads can have thinner physical profile than the devices made with optical imaging sensors.

Figure 25:
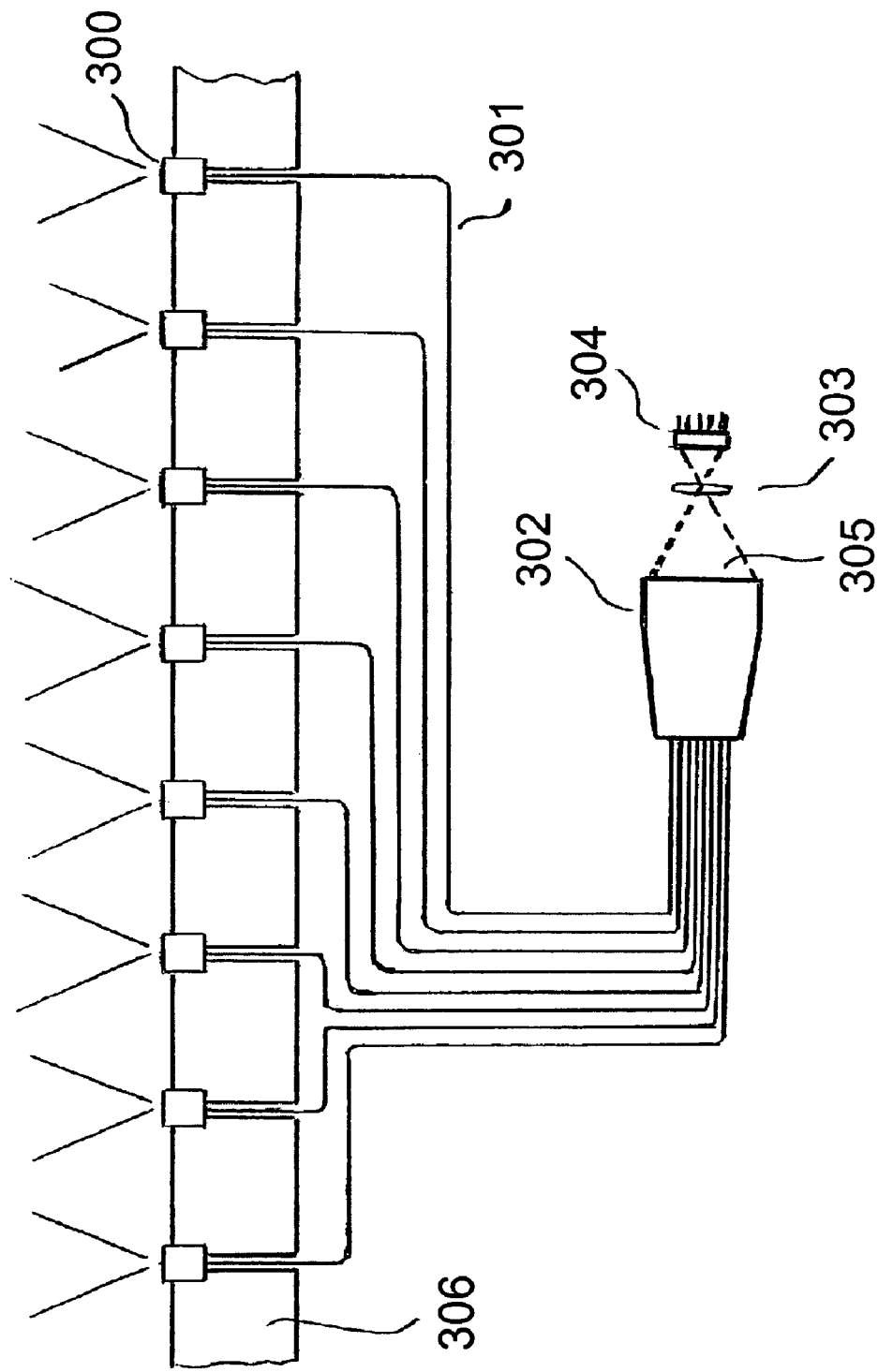
FIG. 25 shows schematically a configuration of a plurality of imaging heads according to another embodiment of the present invention.

Referring now to FIG. 25, when a stationary image is illuminated by illuminating plate 306, the sub-image captured by each individual image head 300 is transferred through waveguides 301 into an image combiner processing unit 302. Thus, waveguides are used in this embodiment to combine sub-images from different imaging heads. A screen 305 associated with the image combiner 302 is used to display the image combined by the image combiner 302, which may be captured by an optical sensor 304 through a focusing lens 303. The sensor 304 may also be directly coupled with the waveguides 301.

Figure 26:
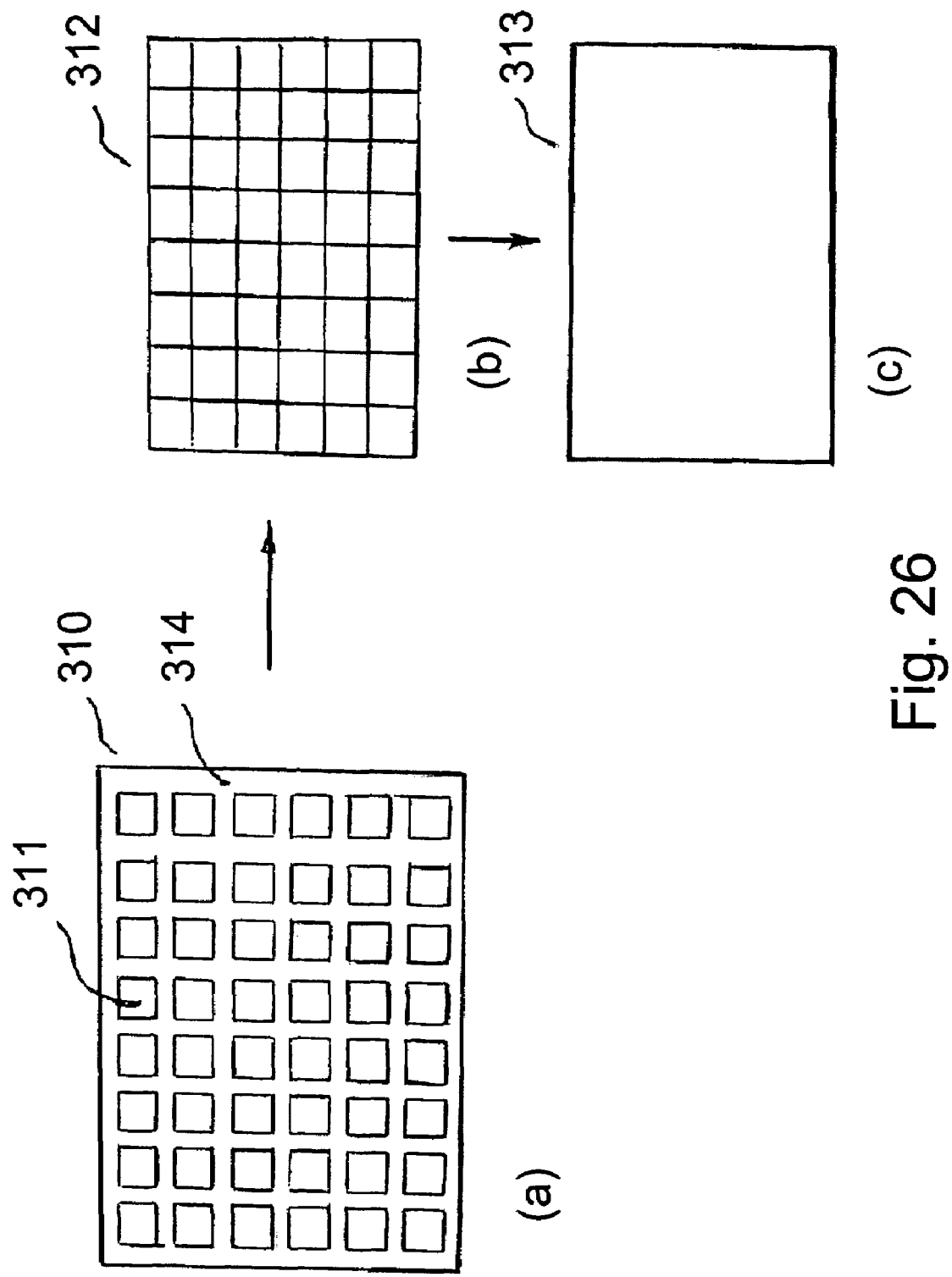
FIG. 26 shows schematically an image process according to one embodiment of the present invention.

A possible configuration 310 of the screen 305 is shown in FIG. 26(*a*). Each sub-screen 311 displays a sub-image from one of the imaging heads 300. The optical sensor 304 captures the entire image on screen 305. The captured image by the optical sensor 304 is processed to remove the parts 314 of the image that do not represent any sub-images of the stationary image, and are there due to the construction of the image combiner 302. The processed image 312 is shown in FIG. 26(*b*). The gridlines shown in FIG. 26(*b*) are removed through further image processing and the final image 313 is shown in the FIG. 26(*c*).

Figure 27:
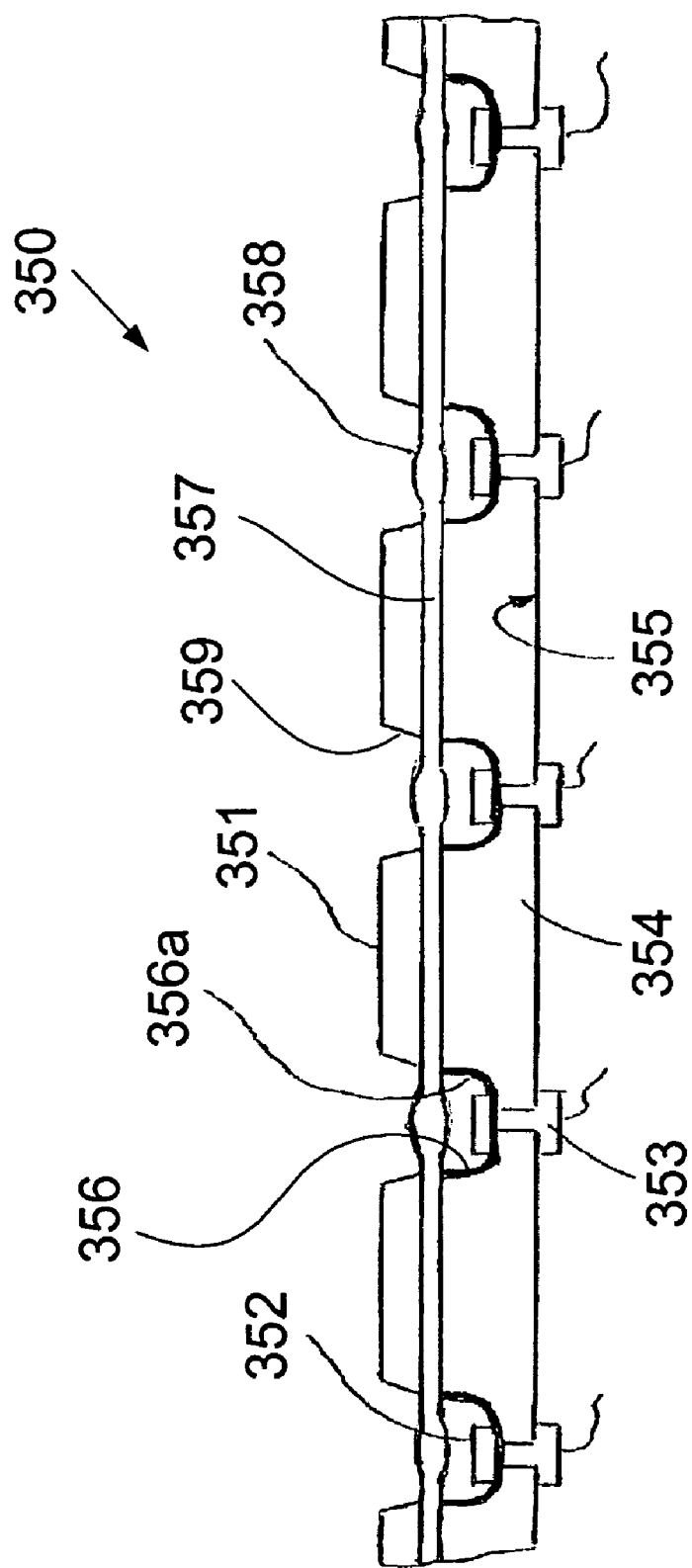
FIG. 27 shows schematically a side cross-sectional view of an optical imaging device according to one embodiment of the present invention.

Another embodiment of an illuminating plate and an imaging head assembly according to the present invention is shown in FIG. 27. To reduce the assembling cost, lenses 358 are built in as a part of a transparent sheet 357, which can be formed by plastics or glass. A diffuser layer 351 is positioned on top of a light guiding layer 354, which is transparent. Optical sensors 352 are received in corresponding recesses 356 and mounted on the transparent light guiding layer 354 by fixtures 353. The bottom upward facing surface 355 of the light guiding plate 354 is rugged and substantially reflective. The sidewall 356*a* of the recess 356 in each imaging head is non-transparent so as to block stray lights from reaching the optical sensor 352 directly from the light guiding layer 354. The upper side of the recess 356 is the viewing area of the imaging heads. This construction ensures minimal assembling work and consistent distance among imaging heads, a large amount of imaging heads packed in a relatively small area and a thin overall optical imaging device body.

Figure 28:
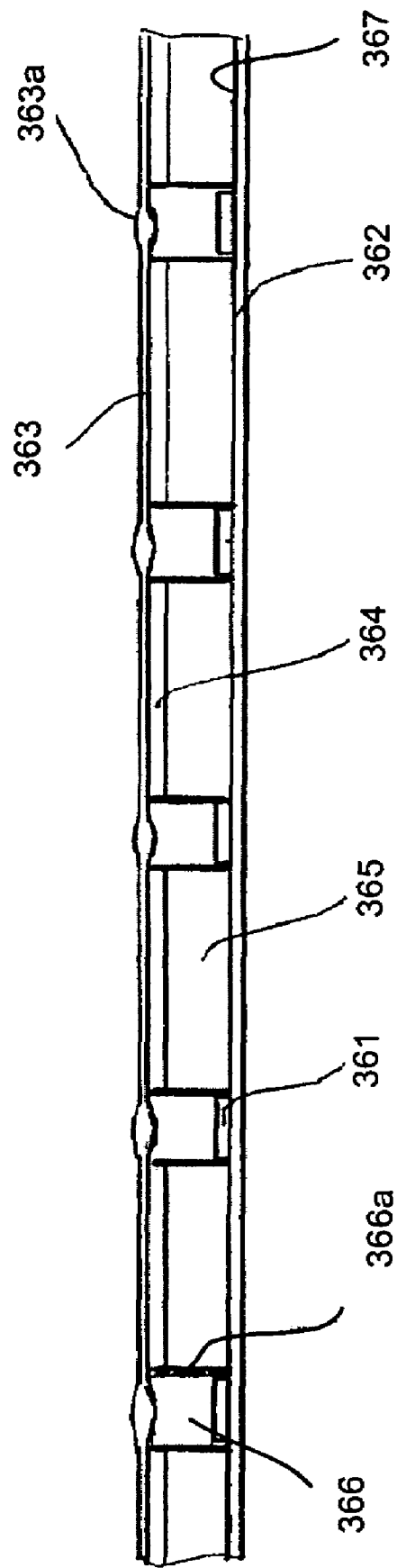
FIG. 28 shows schematically a side cross-sectional view of an optical imaging device according to another embodiment of the present invention.

FIG. 27 is just one example of constructing an optical means including an illuminating plate and an imaging head assembly in the optical imaging device of the present invention. FIG. 28 shows an alternative embodiment of the optical means in the imaging device of the present invention, where optical sensors 361 are mounted on a PCB board 362, for example, by a surface mount technology (SMT), and a transparent thin film (sheet) 363 on which focusing lenses 363*a* are formed is laid on top of a semi-transparent diffuser layer 364 which, in turn, is deposited on a light guiding layer 365. In FIG. 28, the light guiding layer 365 can be made of transparent material such as a glass, transparent plastics or a transparent air. The sidewall 366*a* of the recess 366 in which optical sensors 361 are placed is coated with dark colored, non-transparent coating. The top surface 367 of the PCB board 362 is coated with a reflective and rugged coating. In one embodiment, the top surface 367 of the PCB board 362 is coated with an insulated plastic coating and a reflective and rugged coating on the top of the insulated plastic coating.

Figure 29:
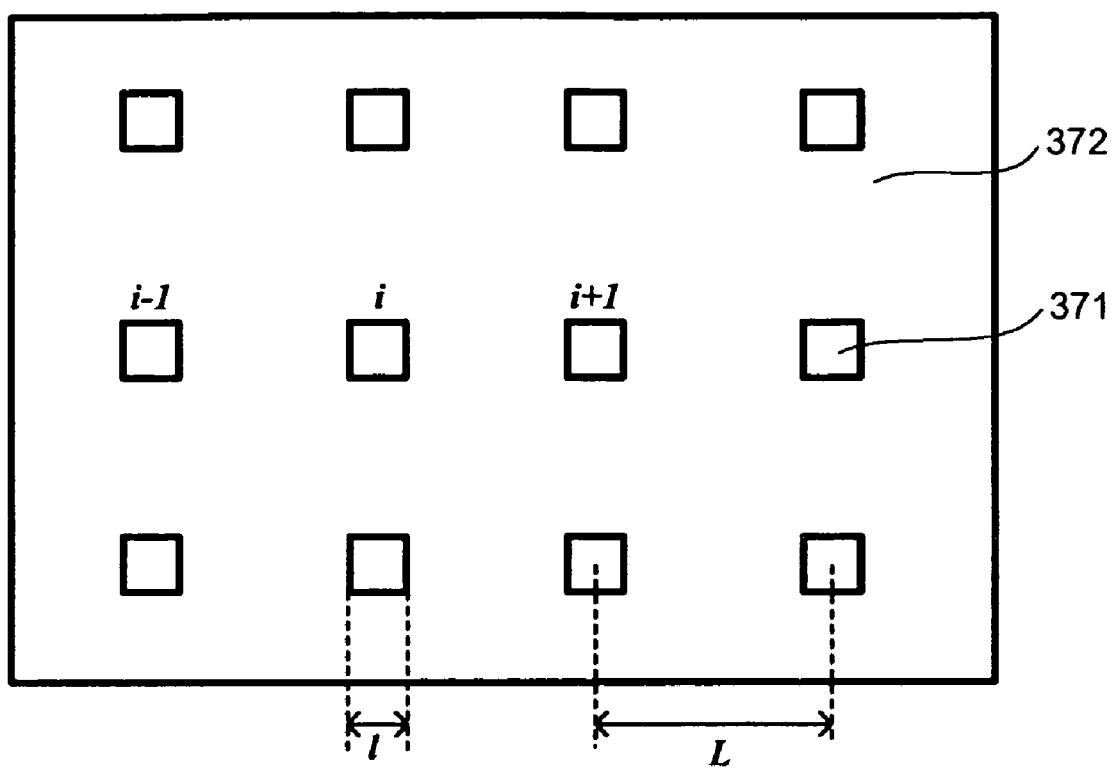
FIG. 29 shows schematically a top cross-sectional view of an optical imaging device according to one embodiment of the present invention.

FIG. 29 shows schematically a top view of an optical image device according to one embodiment of the present invention. The optical image device includes a total number, N, of image heads 371, where N is an integer. Each image head is adapted for acquiring a consecutive partial image of a stationary image that will be processed to obtaining a complete image of the stationary image. In one embodiment, each image head has a head portion with a dimension, and the image heads are positioned on an image sensing board 372 in relation to its neighboring image heads to satisfy the relation of:

$$l < L,$$

with l being a characteristic dimension of the image heads, L being a characteristic distance between two neighboring image heads. The image heads can be substantially identical to each other such that $l = l_1 = l_2 = \ldots = l_N$, $l_i$ being the dimension of the ith image head, $i = 1, 2, \ldots, N$, and N being the total number of the image heads. For the embodiment as shown in FIG. 29, the image heads are substantially identical and N=12. In FIG. 29, the twelve (12) image heads 371 are positioned in an array on the image sensing board 372 such that any two neighboring heads are positioned with a substantially identical minimum distance between them, and $L = L_1 = L_2 = \ldots = L_M$, $L_j$ being a characteristic distance between the jth pair of neighboring image heads, $j = 1, 2, \ldots, M$, and M being the total number of pairs of the neighboring image heads. In other words, the distance between the image head and the ith image head is identical to the distance between the ith image head and the (i+1)th image head, which is L.

Alternatively, at least two or more image heads can be different. Accordingly, the characteristic dimensions of the number of image heads may be different, and $l = \text{Max}\{l_i, i = 1, \ldots, N\}$, $l_i$ being the dimension of the ith image head, $i = 1, 2, \ldots, N$, and N being the total number of the image heads, and Max{ } represents a mathematical operation to choose a maximum value. Thus, here l is the largest dimension from all available $\{l_i, i = 1, \ldots, N\}$.

Furthermore, whether the image heads are identical or different, they can be positioned on an image sensing board such that different pairs of neighboring heads may have different minimum distances, and $L = \text{Min}\{L_j, j = 1, \ldots, M\}$, $L_j$ being a characteristic distance between the jth pair of neighboring image heads, $j = 1, 2, \ldots, M$, M being the total number of pairs of the neighboring image heads, and Min{ } represents a mathematical operation to choose a minimum value. Thus, here l is the smallest characteristic distance from all available $\{L_j, j=1, \ldots, M\}$.

Figure 30:
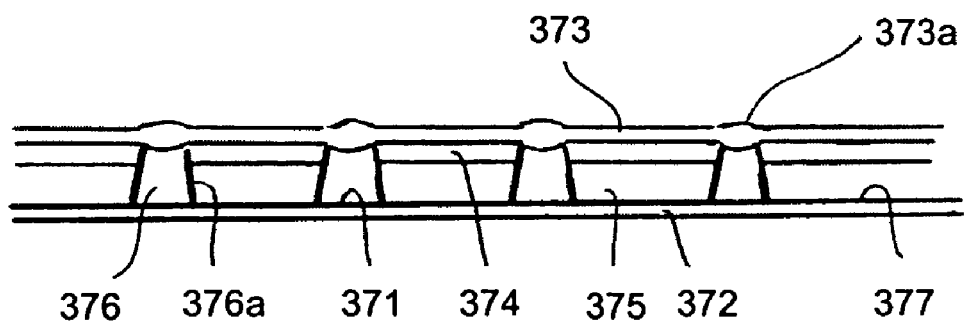
FIG. 30 shows schematically a side cross-sectional view of an optical imaging device as shown in FIG. 29.

FIG. 30 shows schematically a partial side view of the optical image device shown in FIG. 29. In this embodiment, a number of lens structures 373a are formed with a transparent thin film 373. A transparent light guiding layer 375 is adapted for light guiding purpose and a diffuser layer 374 is sandwiched therebetween the transparent thin film 373 and the transparent light guiding layer 375. An image sensing board 372 is in contact with the transparent light guiding layer 375. The image sensing board 372 can be a large area sensor, or made with a series of optical image sensors embedded on a base board. Moreover, a number of cells 376 defining an effective imaging sensing area 371 is positioned on the image sensing board 372. Each cell 376 has a sidewall 376a coated with a non-transparent coating adapted for blocking a stray light transmitting into the effective imaging sensing area 371. In one embodiment, an area 377 of the image sensing board 372 outside the effective imaging sensing area 371 is coated with a reflective and rugged surface coating. As formed, a lens structure 373a and an effective image sensing area 371 in a corresponding cell 376 function as an effective image head. The optical image device shown in FIG. 30 is similar to the optical image device shown in FIG. 28. One difference is that the optical sensors and PCB combination as shown in FIG. 28 are replaced by the sensing board shown in FIG. 29.

The structures shown in FIGS. 27, 28, 29 and 30 can be used in construction of an optical imaging device or an imaging tile.

As disclosed above, in various embodiments of the present invention, among other things, two neighboring sensing areas (or image heads) are spatially separated with a distance, and there is a focusing lens formed on the top of each sensing area so as to form and function as an image head. The sensing areas can be individual optical sensors, or effective sensing areas of a large area sensor. The lens can be individual lenses, or a part of a large film (plate) that has lens structures on the top of the sensing areas.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An optical imaging device having a housing, wherein the housing has a bottom portion, and an opposite, top portion, comprising:

a. an at least partially transparent platform having a first surface, an opposite, second surface, and a thickness, h, defined therebetween by the first surface and the second surface, and positioned over the top portion of the housing for supporting a stationary image placed on the first surface;

b. a reference pattern formed at a plane substantially parallel to and at a distance, d, from the first surface of the at least partially transparent platform, wherein d is greater than zero but not greater than the thickness h of the at least partially transparent platform;

c. a plate placed inside the housing, wherein the plate has a first surface that is substantially reflective and an opposite, second surface, and the plate is positioned above the bottom portion such that the first surface is facing the second surface of the at least partially transparent platform;

d. a number, N, of image heads, each image head having a head portion with a dimension and positioned on the plate in relation to its neighboring image heads to satisfy the relation of:

$l < L$, with l being a characteristic dimension of the number N of image heads, and L being a characteristic distance between two neighboring image heads; and e. a light source positioned inside the housing and adapted to direct a light beam at the first surface of the plate so that the light beam is reflected to the at least partially transparent platform, reflected off the stationary image placed on the first surface of the at least partially transparent platform and received by the number N of image heads to obtain an image of the stationary image placed on the first surface of the at least partially transparent platform.

2. The optical imaging device of claim 1, wherein the reference pattern has at least two colors which are substantially distinguishable from each other.

3. The optical imaging device of claim 2, wherein the reference pattern is formed on the second surface of the at least partially transparent platform at a predetermined position, and the distance d substantially equals to the thickness h of the at least partially transparent platform.

4. The optical imaging device of claim 2, wherein the reference pattern comprises a white area with a plurality of markers, each marker placed at a predetermined position in the white area, and being identifiable from the white area.

5. The optical imaging device of claim 2, wherein the reference pattern comprises a grid.

6. The optical imaging device of claim 1, wherein each of the number N of image heads obtains at least a partial image of the stationary image placed on the first surface of the at least partially transparent platform.

7. The optical imaging device of claim 6, farther comprising an image processing system coupled with the number N of image heads for combining the partial images of the stationary image to form a substantially complete image of the stationary image.

8. The optical imaging device of claim 1, wherein the number N of image heads are substantially identical such that $l=l_1=l_2=\ldots=l_N$, $l_i$ being the dimension of the ith image head, $i=1, 2, \ldots, N$, and N being the total number of the image heads.

9. The optical imaging device of claim 1, wherein the number N of image heads are different such that at least two of image heads may have different characteristic dimensions, and $l=\text{Max}\{l_i, i=1, \ldots, N\}$, $l_i$ being the dimension of the ith image head, $i=1, 2, \ldots, N$, and N being the total number of the image heads.

10. The optical imaging device of claim 1, wherein the number N of image heads are positioned in an array such that any two neighboring heads have a substantially identical minimum distance, and $L=L_1=L_2=\ldots=L_M$, $L_j$ being a characteristic distance between the jth pair of neighboring image heads, j=1, 2, . . . , M, and M being the total number of pairs of the neighboring image heads.

11. The optical imaging device of claim 1, wherein the number N of image heads are positioned in an array such that different pairs of neighboring heads may have different minimum distances, and L=Min{$L_j$, j=1, . . . , M},$L_j$ being a characteristic distance between the jth pair of neighboring image heads, j=1, 2, . . . , M, and M being the total number of pairs of the neighboring image heads.

12. The optical imaging device of claim 1, wherein each of the number N of image heads comprises a lens structure having an optical axis and an imaging sensor placed on the optical axis of the lens structure such that a light received by the lens structure is focused on the imaging sensor.

13. The optical imaging device of claim 1, wherein each of the number N of image heads comprises a lens structure and a waveguide member having an input end and an output end, wherein the lens structure and the waveguide member are arranged such that in operation, a light received by the lens structure is directed into the input end of the waveguide member and transmitted out from the output end of the waveguide member.

14. The optical imaging device of claim 13, wherein the output ends of the waveguide members of the number N of image heads are coupled with one or more image sensors.

15. The optical imaging device of claim 13, wherein the waveguide member comprises a bundle of optical fibers, which are dimensionally associated with one another.

16. The optical imaging device of claim 1, wherein the first surface of the plate is adapted for substantially evenly spreading the emitted light toward the stationary image through the at least partially transparent platform.

17. The optical imaging device of claim 16, wherein the first surface of the plate is rugged.

18. The optical imaging device of claim 1, wherein the light source comprises at least one of a fluorescent light tube, a light emitting diode assembly, a tungsten lamp, a tungsten halogen lamp, a halogen lamp, an Xenon lamp, and any combination thereof.

19. The optical imaging device of claim 1, wherein the at least partially transparent platform comprises a plate made of an at least partially transparent material.

20. The optical imaging device of claim 19, wherein the at least partially transparent platform comprises a glass plate or a transparent plastic plate.

21. An optical imaging device for obtaining an image of a stationary image placed on an at least partially transparent platform, comprising:
   a. at least one illuminating plate having at least one open cell;
   b. at least one imaging head received in the at least one open cell of the at least one illuminating plate; and
   c. a light source adapted for emitting a light,
wherein the at least partially transparent platform, the at least one illuminating plate, and the light source are arranged such that when in operation, a light emitted from the light source is directed into the at least one illuminating plate so that the light is evenly spread toward the at least partially transparent platform, reflected off the stationary image placed on the at least partially transparent platform and received by the at least one image head to obtain the image of the stationary image placed on the at least partially transparent platform.

22. The optical imaging device of claim 21, wherein the at least one image head comprises a lens structure having an optical axis and an imaging sensor placed on the optical axis of the lens structure such that a light received by the lens structure is focused on the imaging sensor.

23. The optical imaging device of claim 21, wherein the at least one image head comprises a lens structure and a waveguide member having an input end and an output end, wherein the lens structure and the waveguide member are arranged such that when in operation, a light received by the lens structure is directed into the input end of the waveguide member and transmitted out from the output end of the waveguide member.

24. The optical imaging device of claim 23, wherein the at least one image head further comprises an imaging sensor coupled with the output end of the waveguide member.

25. The optical imaging device of claim 23, wherein the waveguide member comprises a bundle of optical fibers that are dimensionally associated with one another.

26. The optical imaging device of claim 21, wherein the light source comprises at least one of a fluorescent light tube, a light emitting diode assembly, a tungsten lamp, a tungsten halogen lamp, a halogen lamp, an Xenon lamp, a flat-panel light source and any combination thereof.

27. The optical imaging device of claim 21, wherein the at least one illuminating plate comprises a light guiding layer having a first surface and an opposite, second surface, and a diffuser layer positioned on the first surface of the light guiding layer.

28. The optical imaging device of claim 27, wherein the second surface of the light guiding layer is reflective to a light received by the surface.

29. The optical imaging device of claim 27, wherein the second surface of the light guiding layer is rugged.

30. The optical imaging device of claim 27, wherein the light guiding layer is made of a transparent material.

31. The optical imaging device of claim 30, wherein the transparent material comprises a glass or a transparent plastic material.

32. The optical imaging device of claim 27, wherein the at least one illuminating plate further has a support layer formed on the second surface of the light guiding layer so that an interface is formed therebewteen the support layer and the light guiding layer.

33. The optical imaging device of claim 32, wherein the interface is substantially reflective to a light received by the interface.

34. The optical imaging device of claim 32, wherein the interface is rugged.

35. The optical imaging device of claim 27, wherein the diffuser layer is made of mat glass or semi-transparent plastic.

36. The optical imaging device of claim 27, wherein the at least one illuminating plate comprises further comprises a light aligning layer positioned on the diffuser layer.

37. The optical imaging device of claim 36, wherein the light aligning layer comprises a structural pattern adapted for aligning a light transmitted from the diffuser layer to a predetermined direction.

38. The optical imaging device of claim 37, wherein the structural pattern comprises a plurality of open cells that are dimensionally associated with one another.

39. The optical imaging device of claim 37, wherein the structural pattern comprises a plurality of fibers that are dimensionally associated with one another.

40. The optical imaging device of claim 21, wherein the at least one illuminating plate comprises a support layer having a first surface and an opposite, second surface, a diffuser layer having a first surface and an opposite, second surface, and a space defined therebetween the first surface of the support layer and the second surface of the diffuser layer and containing ambient air.

41. The optical imaging device of claim 40, wherein the first surface of the support layer is substantially reflective to a light received by the surface.

42. The optical imaging device of claim 40, wherein the first surface of the support layer is rugged.

43. The optical imaging device of claim 40, wherein the at least one illuminating plate comprises further comprises a light aligning layer positioned on the first surface of the diffuser layer.

44. An optical imaging device for obtaining an image of a stationary image placed on an at least partially transparent platform having a first surface on which the stationary image is placed, an opposite, second surface, and a thickness, h, defined by the first surface and the second surface, comprising:
   a. a reference pattern formed at a plane substantially parallel to and at a distance, d, from the first surface of the at least partially transparent platform;
   b. optical means for obtaining consecutive partial images of the stationary image, wherein each of the consecutive partial images includes an at least partial image of the reference pattern; and
   c. an image processing system for using the partial image of the reference pattern in each of the consecutive partial images as a reference to combine the consecutive partial images so as to form a substantially complete image of the stationary image.

45. The optical imaging device of claim 44, wherein d is greater than zero.

46. The optical imaging device of claim 45, wherein d is not substantially greater than the thickness h of the at least partially transparent platform.

47. The optical imaging device of claim 44, wherein the reference pattern has at least two colors which are substantially distinguishable from each other.

48. The optical imaging device of claim 47, wherein the reference pattern comprises a white area with a plurality of markers, each marker placed at a predetermined position in the white area, and being identifiable from the white area.

49. The optical imaging device of claim 47, wherein the reference pattern comprises a grid.

50. The optical imaging device of claim 44, wherein the optical means comprises at least one image head.

51. The optical imaging device of claim 44, wherein the optical means comprises an array of image heads.

52. The optical imaging device of claim 44, wherein the second surface of the at least partially transparent platform has an anti-reflective coating.

53. A method for obtaining an image of a stationary image placed on an at least partially transparent platform having a first surface on which the stationary image is placed, an opposite, second surface, and a thickness, h, defined by the first surface and the second surface, comprising the steps of:
   a. forming a reference pattern at a plane substantially parallel to and at a distance, d, from the first surface of the at least partially transparent platform;
   b. obtaining consecutive partial images of the stationary image, wherein each of the consecutive partial images includes an at least partial image of the reference pattern; and
   c. using the partial image of the reference pattern in each of the consecutive partial images as a reference to combine the consecutive partial images so as to form a substantially complete image of the stationary image.

54. The method of claim 53, wherein d is greater than zero.

55. The method of claim 54, wherein d is not substantially greater than the thickness h of the at least partially transparent platform.

56. The method of claim 53, wherein the reference pattern has at least two colors which are substantially distinguishable from each other.

57. The method of claim 56, wherein the reference pattern comprises a white area with a plurality of markers, each marker placed at a predetermined position in the white area, and being identifiable from the white area.

58. The method of claim 56, wherein the reference pattern comprises a grid.

59. The method of claim 53, wherein the obtaining step is performed with at least one image head.

60. The method of claim 53, wherein the obtaining step is performed with an array of image heads.

61. An optical imaging device for obtaining an image of a stationary image placed on an at least partially transparent platform having a first surface on which the stationary image is placed, an opposite, second surface, and a thickness, h, defined by the first surface and the second surface, comprising:
   two or more image heads for obtaining images of the stationary image, wherein each of the image heads has a head portion with a dimension and the two or more image heads are positioned in relation to each other to satisfy the relation of:

$l < L$, with l being a characteristic dimension of the image heads, L being a characteristic distance between two neighboring image heads; and
   a reference pattern formed at a plane substantially parallel to and at a distance, d, from the first surface of the at least partially transparent platform.

62. The optical imaging device of claim 61, wherein the image heads are different such that at least two of image heads may have different characteristic dimensions, and $l = \mathrm{Max}\{l_i, i=1, \ldots, N\}$, $l_i$ being the dimension of the ith image head, $i = 1, 2, \ldots, N$, and N being the total number of the image heads.

63. The optical imaging device of claim 61, wherein the image heads are positioned in an array such that any two neighboring heads have a substantially identical minimum distance, and $L = L_1 = L_2 = \ldots = L_M$, $L_j$ being a characteristic distance between the jth pair of neighboring image heads, $j = 1, 2, \ldots, M$, and M being the total number of pairs of the neighboring image heads.

64. The optical imaging device of claim 61, wherein the image heads are positioned in an array such that different pairs of neighboring heads may have different minimum distances, and $L = \mathrm{Min}\{L_j; j=1, \ldots, M\}$, $L_j$ being a characteristic distance between the jth pair of neighboring image heads, $j = 1, 2, \ldots, M$, and M being the total number of pairs of the neighboring image heads.

65. The optical imaging device of claim 61, wherein the image heads are substantially identical such that $l = l_1 = l_2 = \ldots = l_N$, $l_i$ being the dimension of the ith image head, $i = 1, 2, \ldots, N$, and N being the total number of the image heads.

66. The optical imaging device of claim 61, wherein d is greater than zero.

67. The optical imaging device of claim 66, wherein d is not substantially greater than the thickness h of the at least partially transparent platform.

68. The optical imaging device of claim 61, wherein the reference pattern comprises a white area with a plurality of markers, each marker placed at a predetermined position in the white area, and being identifiable from the white area.

69. The optical imaging device of claim 61, wherein the reference pattern comprises a grid.

70. The optical imaging device of claim 61, wherein the two or more image heads for obtaining images of the stationary image are adapted for obtaining consecutive partial images of the stationary image, and wherein each of the consecutive partial images includes an at least partial image of the reference pattern.

71. The optical imaging device of claim 70, further comprising an image processing system for using the partial image of the reference pattern in each of the consecutive partial images as a reference to combine the consecutive partial images so as to form a substantially complete image of the stationary image.

72. The optical imaging device of claim 70, wherein the second surface of the at least partially transparent platform has an anti-reflective coating.

73. An imaging tile mountable and modulable to an optical imaging device, comprising at least one image head for obtaining an image of a stationary image, wherein the imaging tile is formed in a multilayer structure; and wherein the multilayer structure comprises a light guiding layer having a first surface, an opposite, second surface and a lateral, third surface joined by the first surface and the second surface, and a diffuser layer deposited on the first surface of the light guiding layer.

74. The imaging tile of claim 73, wherein the multilayer structure further comprises an aligning layer deposited on the diffuser layer and adapted for aligning a light transmitted from the diffuser layer to a predetermined direction.

75. The imaging tile of claim 73, wherein the third surface of the light guiding layer has an anti-reflective coating.

\* \* \* \* \*